US008699969B2

(12) United States Patent
Wang et al.

(10) Patent No.: US 8,699,969 B2
(45) Date of Patent: *Apr. 15, 2014

(54) REVERSE LINK MOBILE TRANSMIT DIVERSITY

(71) Applicant: VIA Telecom, Inc., San Diego, CA (US)

(72) Inventors: Shu Wang, San Diego, CA (US); Hong-Kui Yang, San Diego, CA (US)

(73) Assignee: VIA Telecom Co., Ltd., George Town (KY)

( * ) Notice: Subject to any disclaimer, the term of this patent is extended or adjusted under 35 U.S.C. 154(b) by 0 days.

This patent is subject to a terminal disclaimer.

(21) Appl. No.: 13/905,903

(22) Filed: May 30, 2013

(65) Prior Publication Data

US 2013/0259147 A1   Oct. 3, 2013

Related U.S. Application Data

(63) Continuation of application No. 12/840,473, filed on Jul. 21, 2010, now Pat. No. 8,472,892.

(60) Provisional application No. 61/227,077, filed on Jul. 21, 2009, provisional application No. 61/235,368, filed on Aug. 20, 2009, provisional application No. 61/241,029, filed on Sep. 10, 2009.

(51) Int. Cl.
*H04B 1/00* (2006.01)
*H04B 7/00* (2006.01)
*H04B 17/00* (2006.01)

(52) U.S. Cl.
USPC .......... 455/101; 455/522; 455/69; 455/115.1; 455/226.1

(58) Field of Classification Search
CPC ...................................................... H04B 7/0417
USPC ....................... 455/101, 562.1, 524, 525, 560
See application file for complete search history.

(56) References Cited

U.S. PATENT DOCUMENTS

| | | | |
|---|---|---|---|
| 6,879,813 B2 * | 4/2005 | Reznik ....................... | 455/67.11 |
| 7,054,639 B2 * | 5/2006 | Lin et al. .................... | 455/452.1 |
| 7,633,905 B1 * | 12/2009 | Harel et al. ..................... | 370/334 |
| 7,945,222 B2 * | 5/2011 | Harel et al. ................... | 455/101 |
| 7,961,807 B2 * | 6/2011 | Kotecha et al. ............... | 375/267 |
| 7,965,649 B2 * | 6/2011 | Tee et al. ....................... | 370/252 |
| 7,986,672 B2 * | 7/2011 | Tiedemann et al. .......... | 370/332 |
| 8,095,166 B2 | 1/2012 | Sampath et al. | |
| 8,280,430 B2 | 10/2012 | Naguib et al. | |
| 8,290,098 B2 * | 10/2012 | Onggosanusi et al. ....... | 375/346 |
| 8,340,605 B2 | 12/2012 | Hou et al. | |

(Continued)

FOREIGN PATENT DOCUMENTS

| | | |
|---|---|---|
| CN | 101064529 | 10/2007 |
| CN | 101138220 | 3/2008 |
| CN | 101399799 | 4/2009 |

*Primary Examiner* — Tilahun B Gesesse
(74) *Attorney, Agent, or Firm* — Richard K. Huffman; James W. Huffman

(57) ABSTRACT

An access network is wirelessly coupled to an access terminal. The access network comprises a plurality of communication modules, a transmitter and a channel estimator. The plurality of communication modules coupled to the access terminal and configured to transmit a plurality of signals. The transmitter coupled to the access terminal and configured to send an index which indicates number of the plurality of signals. The channel estimator, configured to adjust and modulate a channel state information into the plurality of signals.

28 Claims, 17 Drawing Sheets

(56) References Cited

U.S. PATENT DOCUMENTS

| | | | |
|---|---|---|---|
| 8,369,793 B2* | 2/2013 | Molnar | 455/67.13 |
| 8,374,650 B2* | 2/2013 | Kotecha et al. | 455/561 |
| 8,542,765 B2* | 9/2013 | Mantravadi et al. | 375/295 |
| 2002/0196842 A1* | 12/2002 | Onggosanusi et al. | 375/148 |
| 2003/0161285 A1* | 8/2003 | Tiedemann et al. | 370/332 |
| 2004/0147234 A1* | 7/2004 | Lin et al. | 455/101 |
| 2007/0099670 A1 | 5/2007 | Naguib et al. | |
| 2007/0104087 A1* | 5/2007 | Tee et al. | 370/208 |
| 2008/0130613 A1* | 6/2008 | Tiedemann et al. | 370/342 |
| 2008/0144737 A1* | 6/2008 | Naguib | 375/299 |
| 2008/0227405 A1* | 9/2008 | Harel et al. | 455/69 |
| 2011/0081871 A1* | 4/2011 | Molnar | 455/67.13 |
| 2011/0134848 A1* | 6/2011 | Tamaki | 370/328 |
| 2012/0087304 A1* | 4/2012 | Porat et al. | 370/328 |
| 2013/0010845 A1* | 1/2013 | Onggosanusi et al. | 375/219 |
| 2013/0114425 A1* | 5/2013 | Sayana et al. | 370/252 |
| 2013/0301551 A1* | 11/2013 | Ghosh et al. | 370/329 |

* cited by examiner

DIRECTION MODULATION

DIFFERENTIAL MODULATION

REVERSE LINK MOBILE TRANSMIT DIVERSITY

CROSS-REFERENCE TO RELATED APPLICATIONS

This application is a continuation of U.S. Nonprovisional application Ser. No. 12/840,473, filed on Jul. 21, 2010, entitled "REVERSE LINK MOBILE TRANSMIT DIVERSITY," having common inventors and a common assignee.

U.S. Nonprovisional application Ser. No. 12/840,473 claims the benefit of the following U.S. Provisional Applications, each of which is herein incorporated by reference for all intents and purposes.

| SERIAL NUMBER | FILING DATE | TITLE |
| --- | --- | --- |
| 61227077 (VTU.09-0043-US) | Jul. 21, 2009 | REVERSE LINK MOBILE TRANSMIT DIVERSITY |
| 61235368 (VTU.09-0046-US) | Aug. 20, 2009 | REVERSE LINK MOBILE TRANSMIT DIVERSITY |
| 61241029 (VTU.09-0050-US) | Sep. 10, 2009 | REVERSE LINK MOBILE TRANSMIT DIVERSITY |

BACKGROUND OF THE INVENTION

1. Field of the Invention

This invention relates in general to the field of microelectronics, and more particularly to an apparatus and method for improving the data throughput over a cellular network.

2. Description of the Related Art

The cell phone industry is undergoing exponential growth, not only in this country, but all over the world. In fact, it is well known that the over twenty percent of the adult population in the United States do not even have a traditional landline telephone. In addition to those who do not own a conventional telephone, nearly ninety percent of the adult population owns a wireless phone.

And the usage of cell phones is increasing as well over the use of traditional landline telephone coverage. In fact, one in seven adults now uses only cell phones. Whereas in the past cell phones were used when a landline was not available or under emergency conditions, lower carrier rates, affordability of family packages, and free mobile-to-mobile or friend-to-friend promotions have fostered in significant increases in usage. It is not uncommon today to walk into any public forum or facility and notice a majority of the people there talking on their cell phones.

The ability to communicate using a mobile phone, or mobile station, has been available since the middle of the last century. However, during the 1990's so-called "2G" or second generation mobile phone systems were provided that began the growth in both deployment and usage that we currently enjoy today. These initial systems predominately provided for the routing and reliable servicing of voice calls between parties. And, as one skilled in the art will appreciate, there are a number of timing and latency requirements associated with transmission and reception of voice data in order to maintain quality of service.

And although wireless cellular network technologies have continued to provide improvements related to the ability to process voice calls, there has also been an enormous pull on the industry to provide improvements related to the number of calls and quality of calls that can be processed. One such technique is known as multiple-input multiple-output (MIMO) employs multiple antennas on both mobile stations (i.e., cell phones) and their base stations to achieve these goals. However, the problems inherent in employing single antenna systems are only exacerbated when more than one transmitter/receiver pair is involved.

Accordingly, what is needed is a technique that enables a cellular data network to process increasing amounts of voice and data traffic in a system that utilizes MIMO techniques.

In addition, what is needed is an apparatus and method for a base station, or access network to direct a given cell phone, or access terminal to adjust the relative phase, delay, and/or power that is being transmitted via one or more of a plurality of transmit antennas.

SUMMARY OF THE INVENTION

The present invention, among other applications, is directed to solving the above-noted problems and addresses other problems, disadvantages, and limitations of the prior art.

The present invention provides a superior technique for adjust the relative phase, delay, and/or power that is being transmitted between the access network and the terminal. In one embodiment, the present invention contemplates an apparatus wirelessly coupled to an access network, the apparatus comprising a plurality of communication modules, a receiver and a processor. The plurality of communication modules coupled to the access network and configured to receive a plurality of signals corresponding to the communication modules. The receiver, coupled to the access network and configured to receive an index form the access network which indicates number of the plurality of signals. The processor, configured to adjust the transmitting gain of the apparatus.

One aspect of the present invention contemplates an apparatus for wirelessly coupled to an access terminal, the apparatus comprising a plurality of communication modules, a transmitter and a channel estimator. The plurality of communication modules coupled to the access terminal and configured to transmit a plurality of signals. The transmitter, coupled to the access terminal and configured to send an index which indicates number of the plurality of signals, and channel estimator, configured to generate plurality of signals according to the signals transmitted by the access terminal.

Another aspect of the present invention comprehends a method for an access terminal which is wirelessly coupled to an access network, the method comprising receiving a plurality of signals corresponding to a plurality of communication modules; receiving an index form the access network which indicates number of the plurality of signals; and adjusting the transmitting gain of the apparatus.

One aspect of the present invention also contemplates a method for an access network which is wirelessly coupled to an access terminal, the apparatus comprising transmitting a plurality of signals corresponding to a plurality of communication modules, sending an index which indicates number of the plurality of signals; and adjusting and modulating a channel state information into the plurality of signals.

Finally, present invention also contemplates a wireless communication system, the system comprising an access terminal and an access network. The access terminal, further comprising a plurality of communication modules, a receiver and a processor. The plurality of communication modules, configured to receive a plurality of signals corresponding to the communication modules. The receiver, configured to receive an index which indicates number of the plurality of signals. The processor, configured to adjust the transmitting gain of the apparatus.

The access network, wireless coupled to the access terminal, the access work comprising a plurality of communication modules, a transmitter and a channel estimator. The plurality of communication modules coupled to the access terminal and configured to transmit the plurality of signals. The transmitter, configured to send the index which indicates number of the plurality of signals. The channel estimator, configured to adjust and modulate a channel state information into the plurality of signals.

BRIEF DESCRIPTION OF THE DRAWINGS

These and other objects, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

In view of the above background discussion on cellular communications and the problems inherent, a discussion of the present invention will now be presented with reference to FIGS. 1-24.

Figure 1:
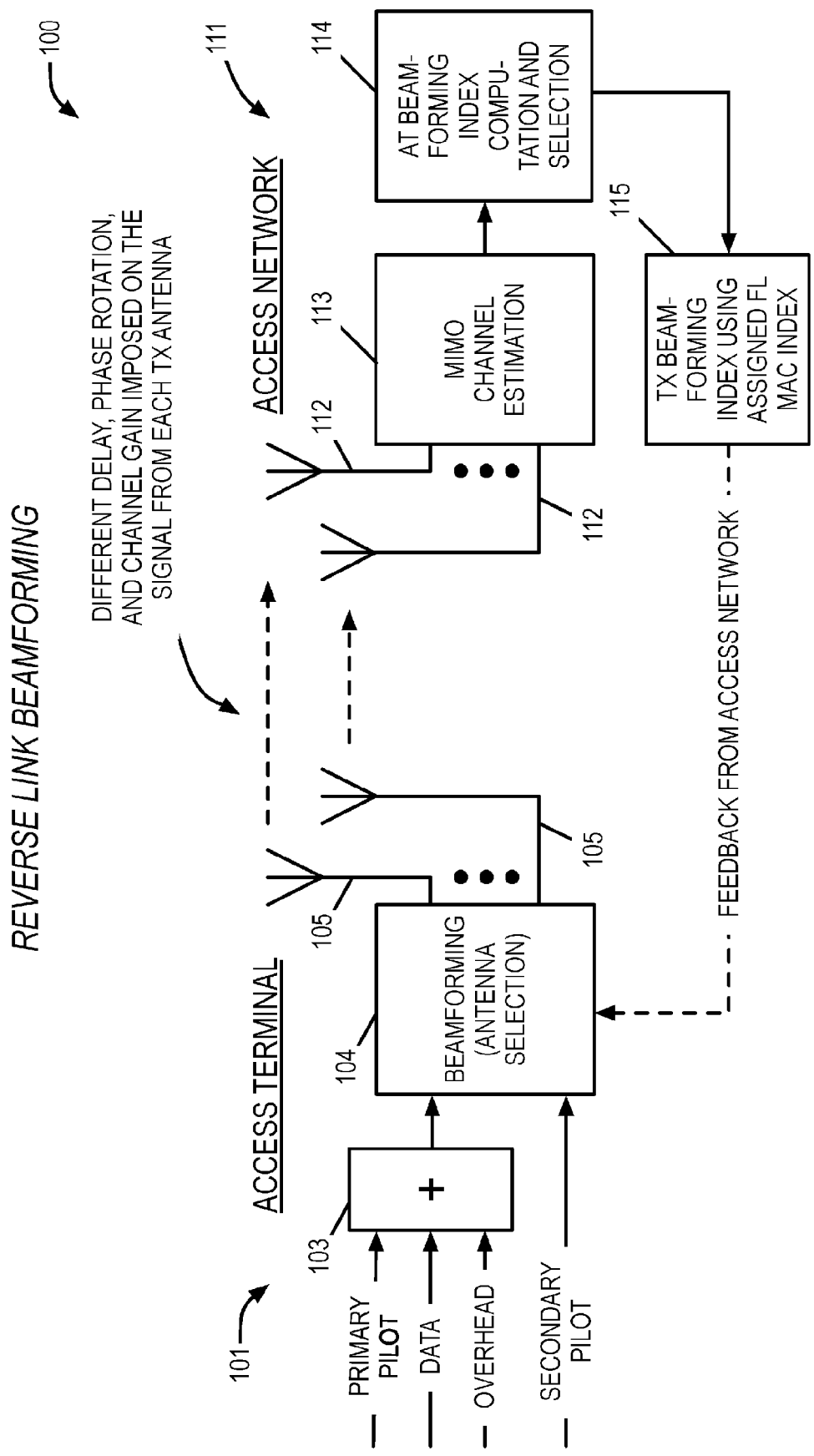
FIG. 1 is a block diagram illustrating a reverse link beamforming technique according to the present invention.

Turning to FIG. 1, a block diagram 100 is presented illustrating a reverse link beamforming technique according to the present invention. According to the present invention, a new reverse link (RL) beamforming feedback architecture is provided for implementing mobile transmit diversity. Three feedback modes are proposed. A first mode contemplates adjustment of a single parameter. The single parameter can be delay, phase, or transmit (TX) power. A second mode comprehends a 2-parameter adjustment, where the 2-parameter adjustment is one of the following parameter pairs: (1) delay and phase; (2) delay and TX power; and (3) phase and TX power. A third mode considers a TDFC (time domain fading channel) which contains phase, delay, and TX power adjustment information.

In each of the three modes noted above, delta modulation is employed for generating a feedback channel. In one embodiment, the delta modulation comprises differential modulation. In another embodiment, the delta modulation comprises delta sigma modulation. When more than one parameter is fed back from a receiver to a transmitter, these parameters can be sent either in the one symbol or media access channel (MAC) transmission or separately in multiple MAC transmissions. According to the present invention, the mode that is utilized to implement mobile transmit diversity is based upon on capability of a particular access terminal (AT, i.e., a mobile cellular device) and upper layer message negotiation and registration of the AT. In one embodiment, delta sigma modulation is employed for encoding feedback phases and amplitudes.

The diagram 100 shows an AT 101, receiving a primary pilot signal, data, overhead, and a secondary pilot. The receiving a primary pilot signal, data, and overhead are summed in summer 103, and the result is provided along with the secondary pilot to a beamforming element 104. The beamforming element 104 adjusts the parameters noted above for transmission over a plurality of transmit antennas 105 to an access network 111 (AN, i.e., a base station). The transmissions from each of the transmit antennas 105 will each have differing delay, phase rotation, and channel gain.

A plurality of receive antennas 112 at the AN 111 provide received signals to a multiple input multiple output (MIMO) channel estimation element 113, the result of which is provided to an AT beamforming index computation and selection element 114. An output of the AT beamforming index computation and selection element 114 is routed to a TX beamforming index using assigned forward link (FL) MAC index element 115, which generated feedback from the AN to the AT, as will be described in more detail herein below.

As one skilled in the art will appreciate, RL beamforming is a technique employed to control the phase (i.e., the delay) and relative amplitude of the signal at the mobile transmitter. Control of relative amplitude is an optional feature according to the present invention. In one aspect RL beamforming is analogous to an opposite of the mechanisms employed by rake receivers and associated equalization receiver techniques employed in the AN. Thus, RL beamforming provides the benefits of improved link-budget, increase sector capacity, and enhanced user experience.

In one embodiment, the phase estimation resolution is approximate to the level of angle spread of given AN, which as one skilled will appreciate, ranges from 2 to 10 degrees dependent upon the particular channel model employed (e.g., urban macrocell, suburban macrocell, urban microcell, indoor hotspot, etc.). Accordingly, the desired beamforming phase estimation resolution is approximately $\frac{1}{8}\pi$ or higher. In addition, antenna gain differentiation information should be approximate to the level of shadowing factor, which varies from roughly 1 decibel (dB) to 8 dB depending upon the channel model. In one embodiment, plus or minus 6 dB or finer resolution is desired.

Figure 2:
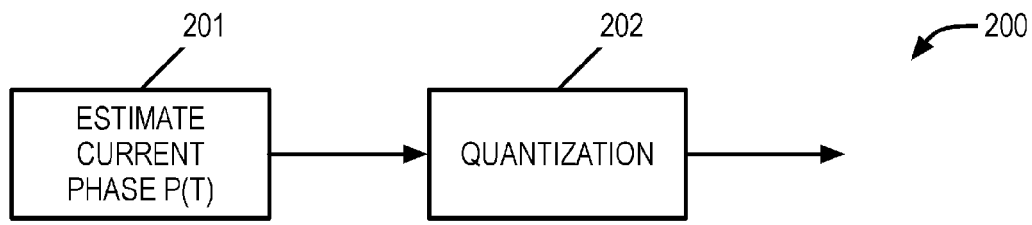
FIG. 2 is a flow diagram depicting a direction modulation method according to the present invention.

Turning to FIG. 2, a flow diagram 200 is presented depicting a direction modulation method according to the present invention. The method includes estimating a current phase 201, then quantizing 202. The estimating 201 includes using one antenna as a reference and calculating the phase difference between two antennas as the current phase. The quantization 202 includes mapping the analog current phase into, for example, two bits.

Figure 3:
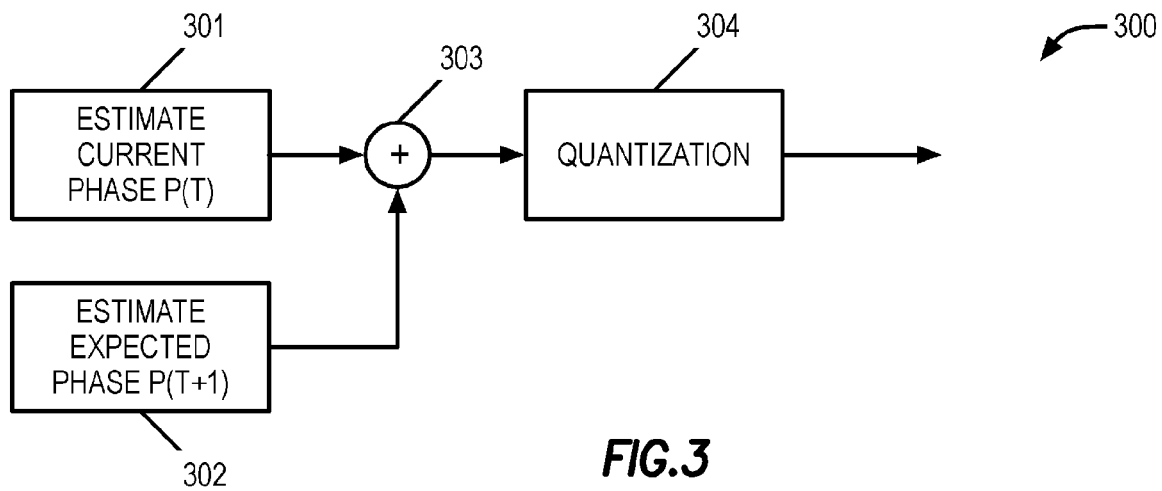
FIG. 3 is a block diagram featuring a differential modulation mechanism according to the present invention.

Referring to FIG. 3, a flow diagram 300 is presented showing a method for differential modulation. According to the present invention. The method comprises estimating a current phase 301 at time T, estimating an expected phase 302 during a next interval P(T+1). The method also includes employing a summer 303 to sum the two phases, and then quantizing the sum 304. The estimating current phase 301 includes using one antenna as a reference and calculating the phase difference between two antennas as the current phase. The estimating expected phase 302 includes calculating the expected phase at time T+1 based on beamforming criteria. The quantization 303 includes mapping the analog current phase into, for example, two bits.

Figure 4:
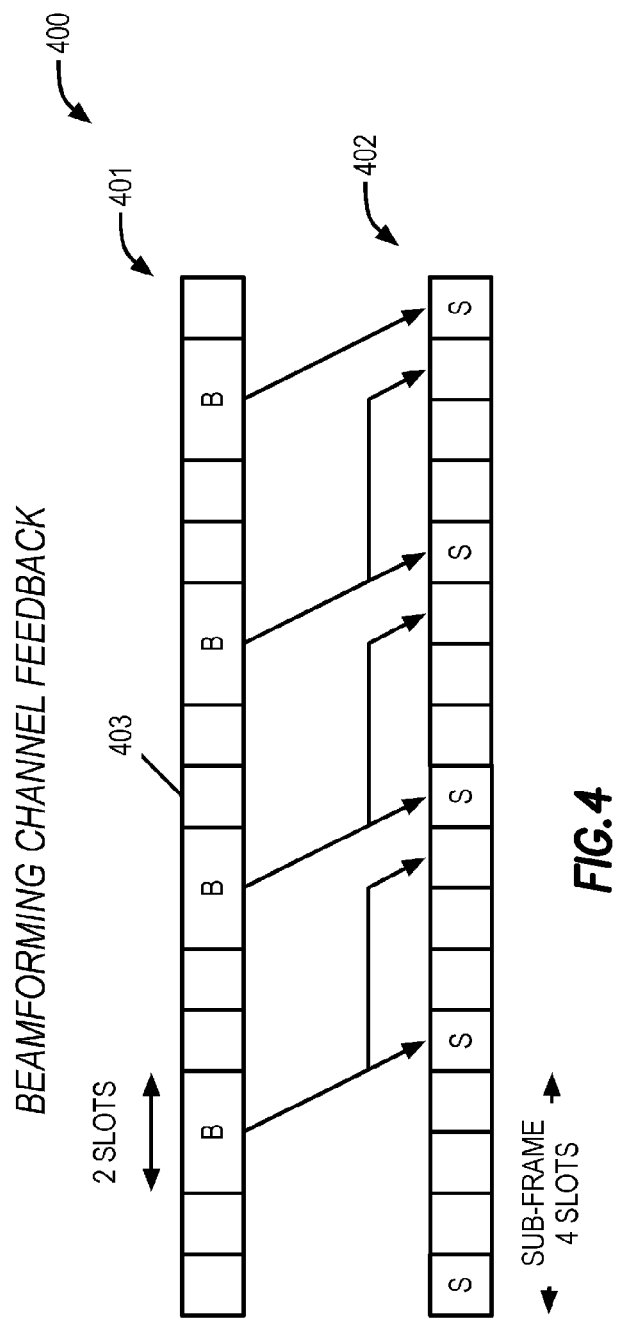
FIG. 4 is a block diagram showing how beamforming channel feedback is employed within slots of both forward and reverse links.

FIG. 4 is a block diagram 400 showing how beamforming channel feedback is employed within slots of both a forward link 401 and reverse link 402 according to the present invention. As one skilled in the art will appreciate, transmissions over the forward link (FL) 401 and reverse link (RL) 402 are divided into a sequence of slots 403. In one embodiment, a beamforming feedback channel (BMFC) is transmitted in the FL 401 for one or two slots 403 for every four slots 403 that are transmitted. The BMFC slot transmission is depicted via a "B." Although the diagram 400 depicts a 2-slot BMFC transmission, a single-slot BMFC configuration is contemplated. In the RL 402, a secondary pilot S is transmitted every sub-frame, which is four slots 403 in length. Thus, the BFMC transmitted over the FL in a particular sub-frame is employed by the AT to adjust parameters for mobile diversity transmission during a following sub-frame over the RL 402. In one embodiment, the BMFC is transmitted using an additional FL MAC index. An AT is operating in closed loop multiple transmitter diversity (CL-MTD) mode is assigned an additional FL MAC index to provide for BMFC. It is contemplated that performance is roughly the same as that of reverse power control (RPC) channel.

As alluded to above, three modes of BMFC are contemplated according to the present invention. The first mode contemplates adjustment of a single parameter. The single parameter can be delay, phase, or transmit (TX) power. According, the single-parameter mode employs one bit to feedback either delay, phase, or TX power using delta modulation. The second mode comprehends a 2-parameter adjustment, where the 2-parameter adjustment is one of the following parameter pairs: (1) delay and phase; (2) delay and TX power; and (3) phase and TX power. Thus, the 2-parameter mode employs two bits per feedback with one bit providing feedback for each parameter, and the mode uses delta modulation as the modulation technique. The third mode considers a TDFC which contains phase, delay, and TX power adjustment information. This mode employs three bits for feedback with one bit for each parameter, and also employs delta modulation as the modulation technique. In the 2-parameter and 3-parameter modes, the feedback bits can either be sent simultaneously or alternately. The phase and power information is encoded and decoded via delta sigma modulation.

Figure 5:
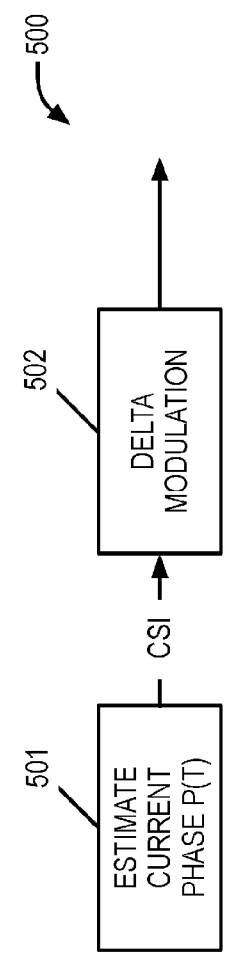
FIG. 5 is a block diagram illustrating an exemplary feedback modulation mechanism according to the present invention.

Referring to FIG. 5, a block diagram is presented illustrating an exemplary feedback modulation mechanism 500 according to the present invention. The mechanism 500 includes estimating a current phase 501 at time T. The current phase CSI is estimated by taking one antenna as a reference and calculating the phase difference between two antennas. The mechanism 500 also takes the current phase CSI and encodes it according to delta modulation 502. The delta modulation can be any of a number of known delta modulation techniques to include direct (or "simple") delta modulation, delta sigma modulation, adaptive delta modulation, leaky delta modulation, etc.

Figure 6:
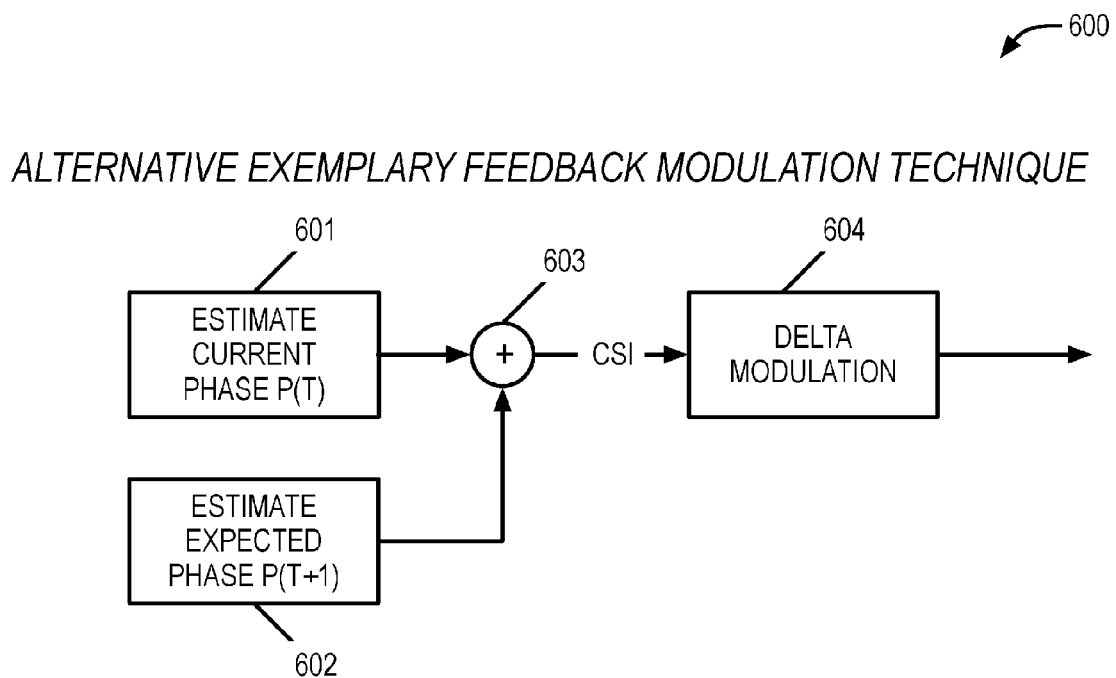
FIG. 6 is a block diagram detailing an alternative exemplary feedback modulation mechanism according to the present invention.

FIG. 6 is a block diagram detailing an alternative exemplary feedback modulation mechanism 600 according to the present invention. The mechanism 600 comprises estimating a current phase 601 at time T and estimating an expected phase 602 at time T+1. The estimating the current phase 601 includes taking one antenna as a reference and calculating the phase difference between two antennas. The estimating the expected phase 602 includes calculating the expected phase at time T+1 based on beamforming criteria. The current phase and expected phase are summed at summer 603 and provided to a delta modulation element 604 for encoding. The delta modulation can be any of a number of known delta modulation techniques to include direct (or "simple") delta modulation, delta sigma modulation, adaptive delta modulation, leaky delta modulation, etc.

Figure 7:
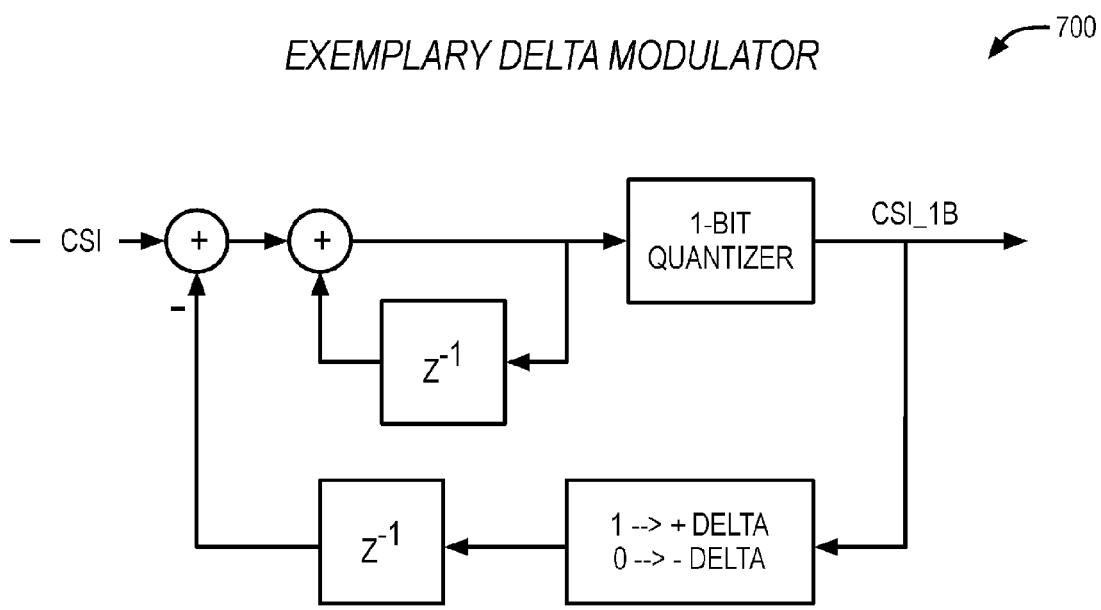
FIG. 7 is a block diagram illustrating an exemplary delta modulator according to the present invention.

FIG. 7 is a block diagram illustrating an exemplary delta modulator 700 according to the present invention. The modulator 700 employs a configuration of adders ("+"), a 1-bit quantizer, unit delay elements ($Z^{-1}$), and delta decoder that interprets a 1 as a plus delta and a 0 as a minus delta, arranged substantially as shown.

Figure 8:
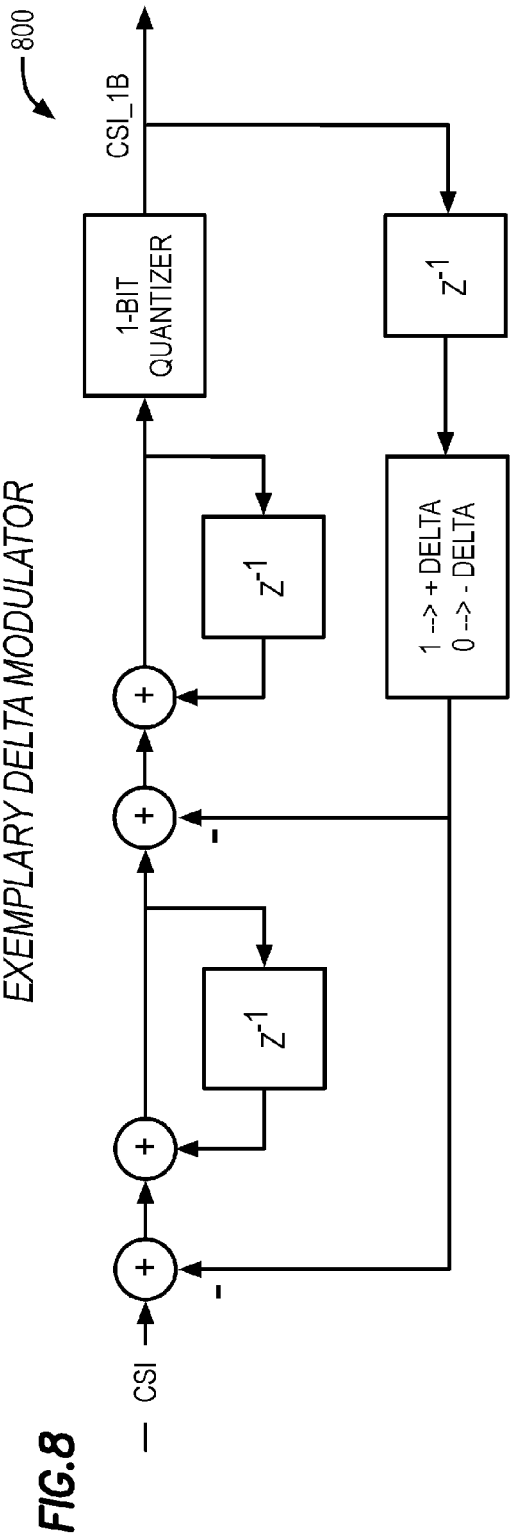
FIG. 8 is a block diagram highlighting another an exemplary delta modulator according to the present invention.

FIG. 8 is a block diagram illustrating another exemplary delta modulator 800 according to the present invention. The modulator 800 employs a configuration of adders ("+"), a 1-bit quantizer, unit delay elements ($Z^{-1}$), and delta decoder that interprets a 1 as a plus delta and a 0 as a minus delta, arranged substantially as shown.

Figure 9:
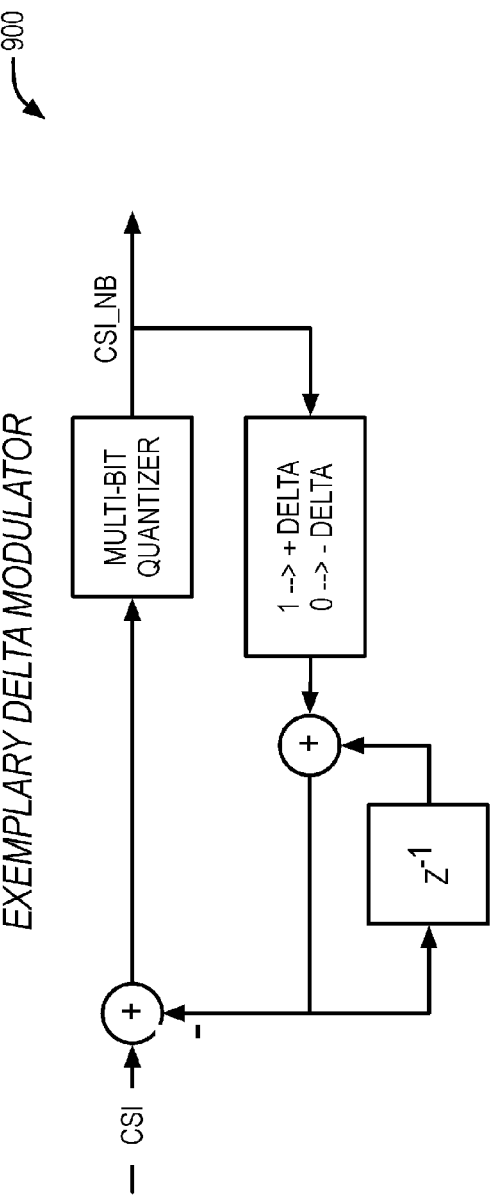
FIG. 9 is a block diagram showing yet another an exemplary delta modulator according to the present invention.

FIG. 9 is a block diagram showing yet another exemplary delta modulator 900 according to the present invention. The modulator 900 employs a configuration of adders ("+"), a multi-bit quantizer, a unit delay element ($Z^{-1}$), and delta decoder that interprets a 1 as a plus delta and a 0 as a minus delta, arranged substantially as shown.

As one skilled in the art will appreciate, delta sigma modulation (DSM) is a method for encoding high resolution signals into lower resolution signals using pulse density modulation (PDM). This technique has been increasingly used in designing analog to digital converters, digital to analog converters, frequency synthesizers, switched-mode power supplies, motor controls, and etc.

Both DSM and direct delta modulation (DM) are variations of delta modulation. Rather than quantizing the absolute value of an input analog waveform, delta modulation quantizes the difference between the current and the previous step. DM is the simplest form of differential pulse code modulation (DPCM). The difference between successive samples is encoded into n-bit data streams. According to the present invention, step size is either fixed to be a smaller value like $\frac{1}{8}\pi$ or $\frac{1}{16}\pi$, $<2\pi/2^n\pi$, where n is the number of coding bits. Alternatively, step size may be adaptive depending on various performance criteria. One criteria, for example, considers the value of inputs. The principle of using DSM is to make rough evaluations of a signal, to measure error, to, integrate the error, and then compensate for that error. In one aspect, quantization contemplates both a 1-bit quantizer, as shown in FIGS. 7 and 8, or a multi-bit quantizer as shown in FIG. 9.

Figure 10:
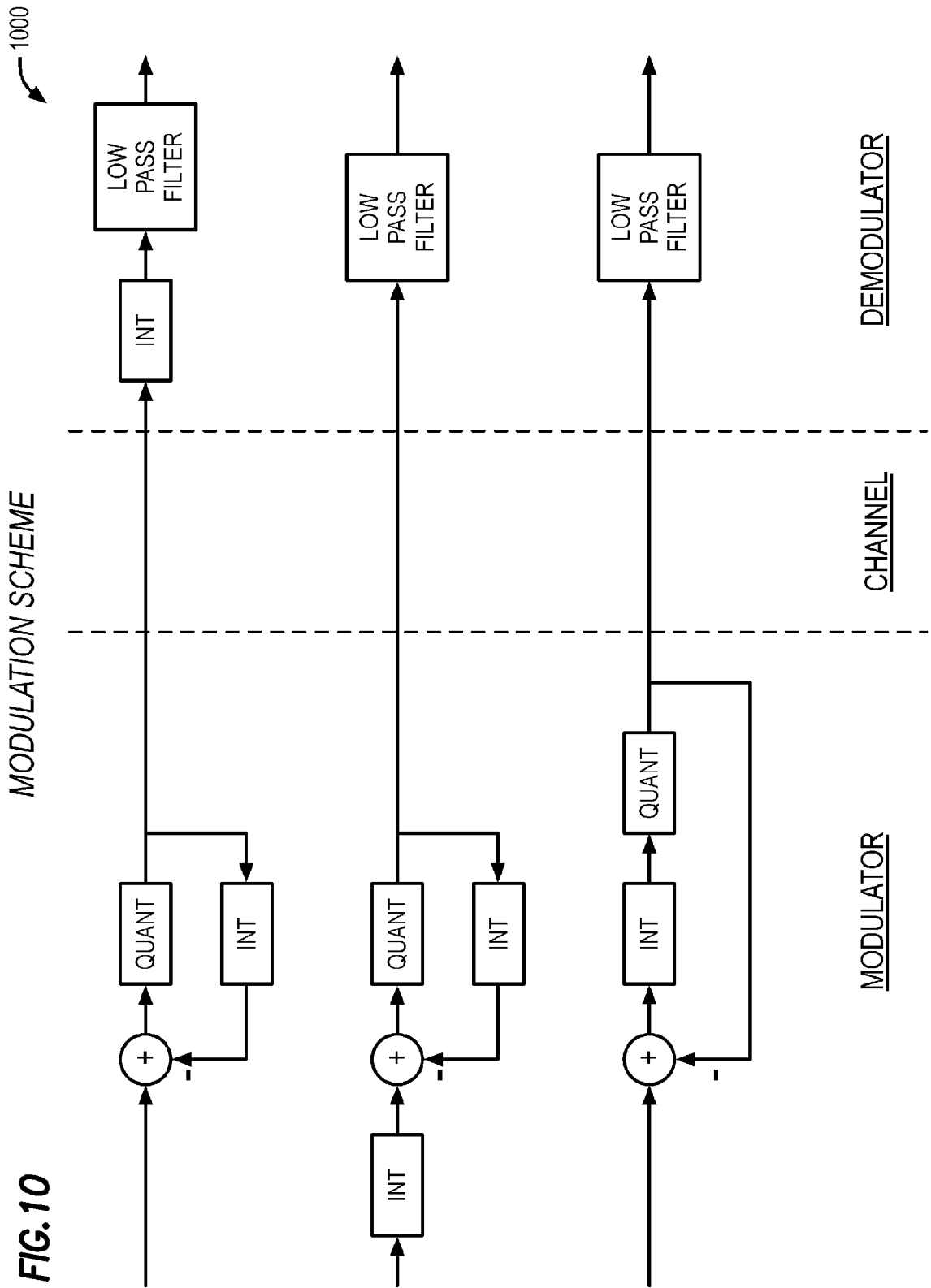
FIG. 10 is a block diagram featuring a modulation scheme according to the present invention for providing reverse link mobile transmit diversity.

Referring now to FIG. 10, a block diagram 1000 is presented featuring a modulation scheme according to the present invention for providing reverse link mobile transmit diversity. The diagram 1000 shows modulation elements within a modulator and demodulation elements within a demodulator, arranged substantially as shown. The modulation elements include summers ("+"), integrators ("INT"), quantizers ("QUANT"), and low pass filters, arranged substantially as shown. As one skilled in the art will appreciate, DSM can be deviated from DM, if the quantization is linear. This deviation is shown in the diagram 1000. Thus, the linearity property of integration makes it possible to move the integrator INT in the demodulator section into front of the modulator. The linearity property of the integration allows the two integrators INT in the modulator to be combined to generate a DSM. The difference between DSM and DM is the position of the integrator INT and quantizer QUANT. Therefore, DSM has a simpler implementation that has the added benefit of shaping/filtering the quantization noise away from signals of interest. The quantized value is the integral of the difference signal, which makes it less sensitive to the rate of change of the signal.

Figure 11:
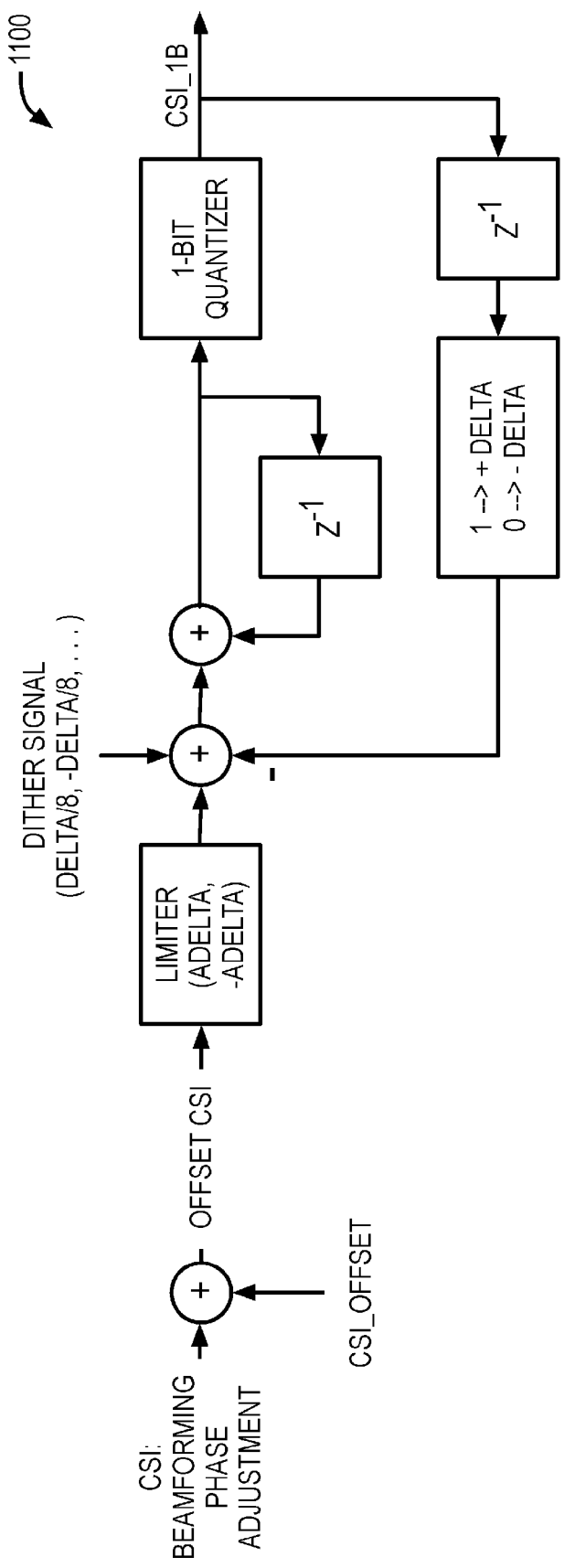
FIG. 11 is a diagram illustrating an exemplary delta sigma modulator according to the present invention.

FIG. 11 is a diagram illustrating an exemplary delta sigma modulator 1100 according to the present invention. The modulator 1100 includes summers ("+"), a 1-bit quantizer, unit delay elements ("$Z^{-1}$") a limiter, and a bit interpreter ("1→+DELTA") arranged substantially as shown.

The exemplary modulator 1100 is easily implemented and yet meets the system requirements noted above. Accordingly, an offset and limiter are applied to a CSI input. A CSI_Offset is used to move the CSI dynamic range within the range required modulator 1100. The limiter is included to prevent overflow. The input level is often less than the quantizer step size and hence is denoted by ADELTA (i.e., A times DELTA) where A is less than 1 dependent on DSM type. A dither signal is also applied to the 1st-order DSM input to eliminate the limit cycle inherent in the 1st-order modulators and is a sequence ($\Delta/8$, $-\Delta/8$). To maximize the signal to noise ratio (SNR) and minimize the delay, an nth-order infinite impulse response (IIR) filter is used to evaluate the performance. The IIR filter consists of n identical one-pole filters with the transfer function defined as follows:

$$H(z) = \left(\frac{1-a}{1-az^{-1}}\right)^n$$

Figure 12:
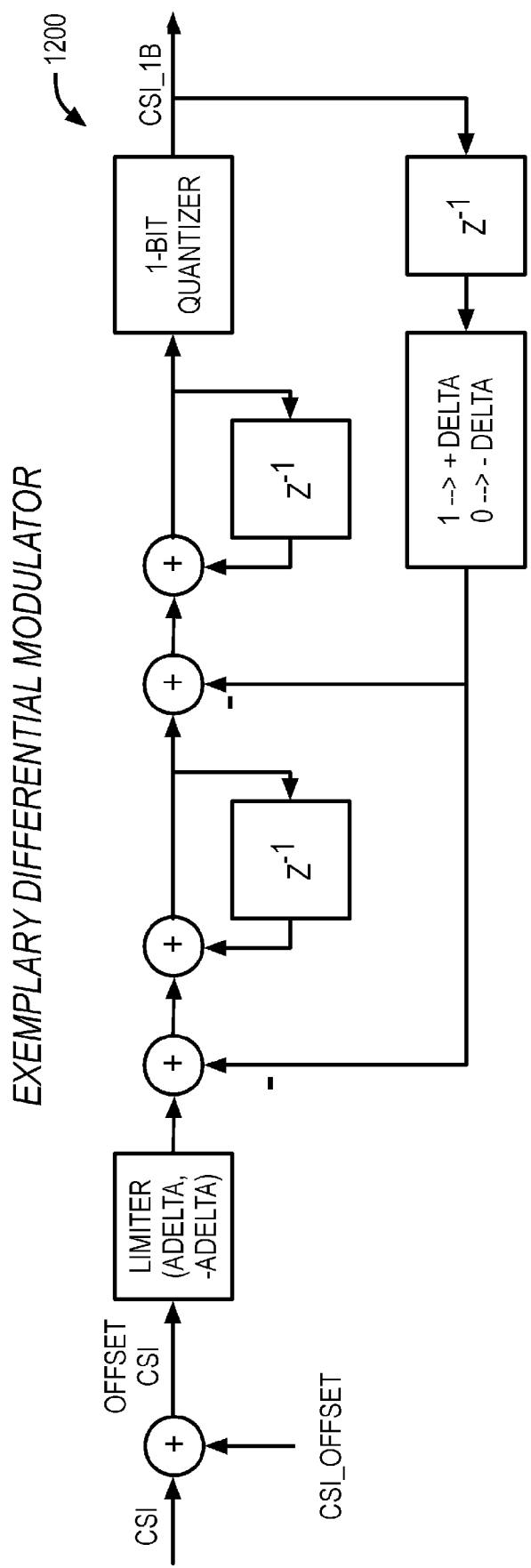
FIG. 12 is a diagram showing an exemplary differential modulator according to the present invention.

FIG. 12 is a diagram showing an exemplary differential modulator 1200 according to the present invention. The modulator 1200 includes summers ("+"), a 1-bit quantizer, unit delay elements ("$Z^{-1}$") a limiter, and a bit interpreter ("1→+DELTA") arranged substantially as shown.

Figure 13:
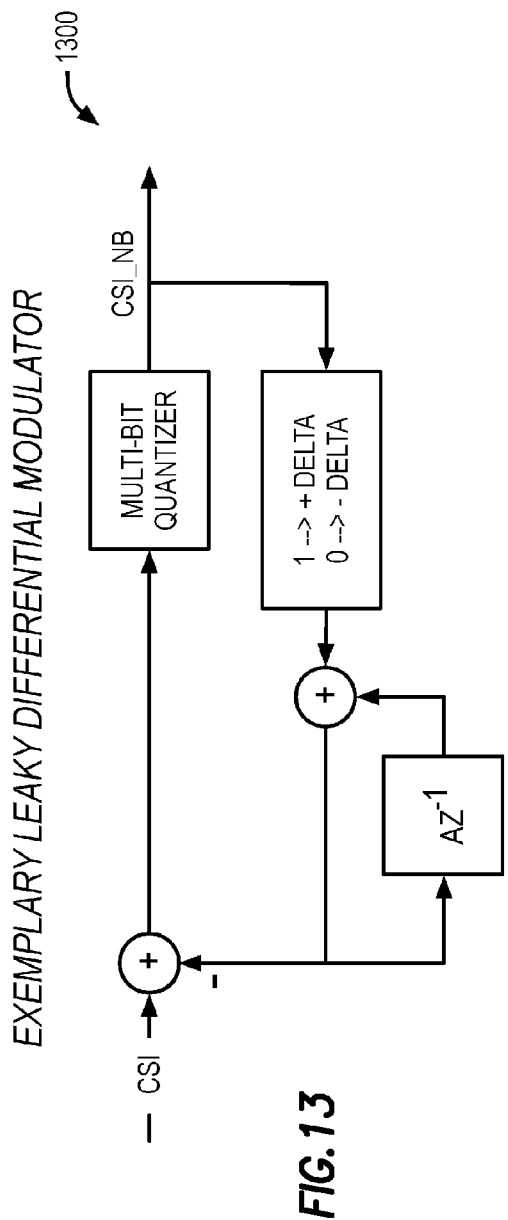
FIG. 13 is a diagram featuring an exemplary leaky differential modulator according to the present invention.

FIG. 13 is a diagram featuring an exemplary leaky differential modulator 1300 according to the present invention. The modulator 1300 includes summers ("+"), a multi-bit quantizer, a limiting unit delay element ("$AZ^{-1}$") a limiter, and a bit interpreter ("1→+DELTA") arranged substantially as shown. The parameter A is used to control the convergence and modulation error. It can be predefined or configured through upper layer messaging. Although quantization is shown as multi-bit, it can be 1-bit as well.

Figure 14:
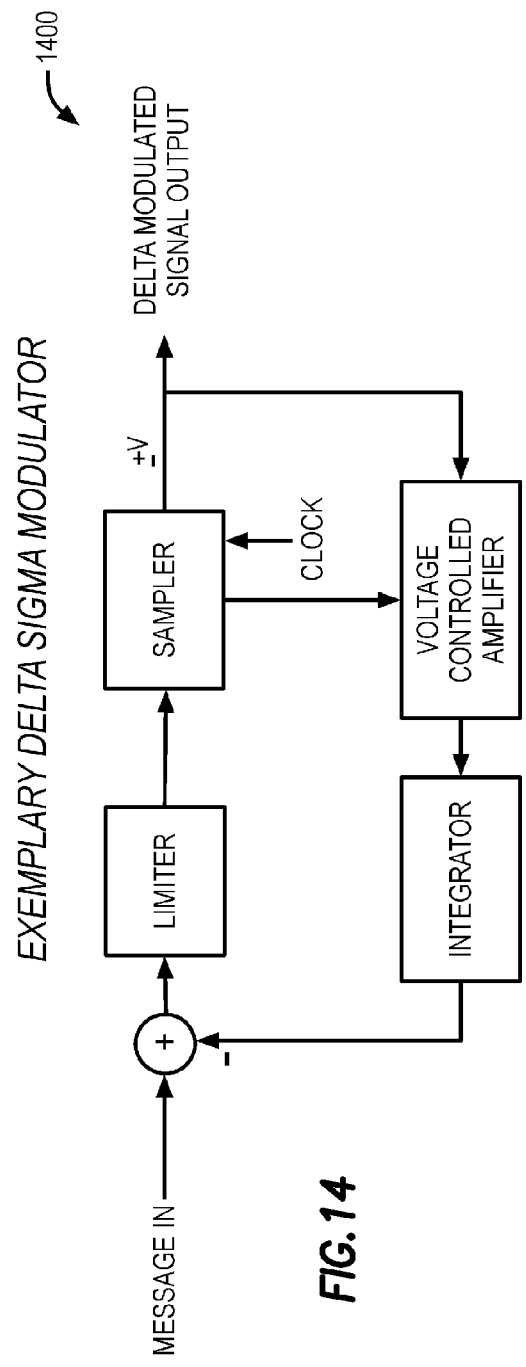
FIG. 14 is a diagram detailing an exemplary delta sigma modulator according to the present invention.

FIG. 14 is a diagram detailing an exemplary adaptive delta sigma modulator 1400 according to the present invention which exhibits adaptive features. The adaptive delta modulator 1400 includes a summer, a limiter, a sampler, a voltage controlled amplifier, and an integrator configured substantially as shown.

Continuously variable slope delta modulation (CVSDM) (or "adaptive delta modulation" (ADM)) is a differential method exhibiting a variable step size. CVSDM encodes at 1-bit or multiple bits per sample. The encoder maintains a reference sample and a step size. Each input sample is compared to the reference sample. If the input sample is larger, the encoder emits a 1 bit and adds the step size to the reference sample. If the input sample is smaller, the encoder emits a 0 bit and subtracts the step size from the reference sample. The encoder also keeps the previous N bits of output (N=3 or N=4 are very common) to determine adjustments to the step size. If the previous N bits are all 1s or 0s, the step size is doubled. Otherwise, the step size is halved. The step size is adjusted for every input sample processed.

A CVSDM decoder (not shown) reverses this process, starting with the reference sample, and adding or subtracting the step size according to the bit stream. The sequence of adjusted reference samples are the reconstructed waveform, and the step size is doubled or halved according to the same all-1s-or-0s logic as is employed in the modulator 1400.

Adaptation of step size allows one to avoid slope overload (step of quantization increases when the signal rapidly changes) and decreases granular noise when the signal is constant (decrease of step of quantization). CVSDM is sometimes employed as a compromise to balance simplicity of implementation, low bit rate, and quality.

Figure 15:
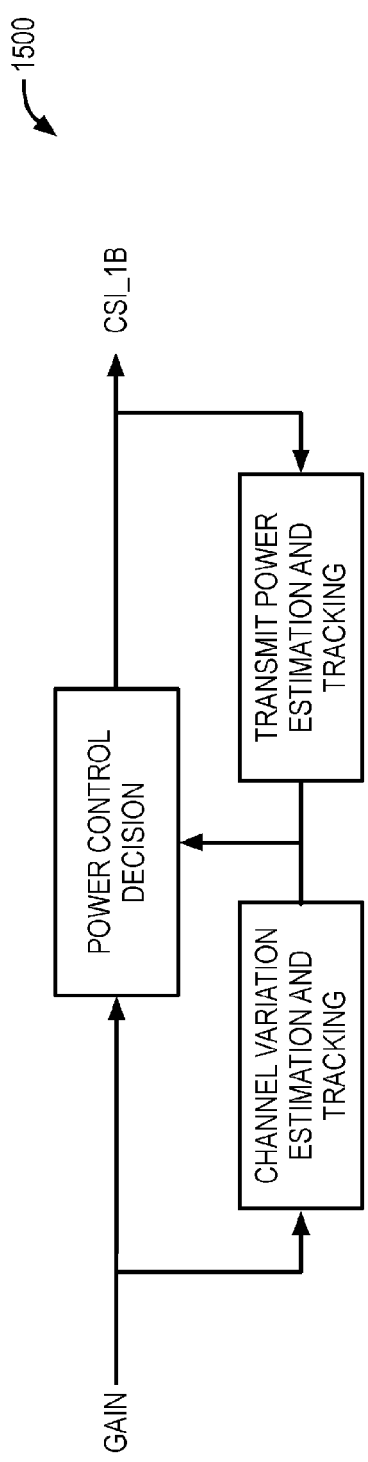
FIG. 15 is a diagram showing a flow for access network side channel quantization according to the present invention.

FIG. 15 is a diagram 1500 showing a flow for access network side channel quantization according to the present invention. A gain signal is provided to a power decision control element and a channel variation estimation and tracking element. The power decision control element generates a single-bit CSI signal, which is fed back to a transmit power estimation and tracking element. The outputs of the channel variation estimation and tracking element and the transmit power estimation and tracking element are provided to the power control decision element. To support beamforming feedback for transmit power (gain) adjustment, the present invention contemplates antenna gain differentiation information approximately similar to shadowing factor level. Thus, plus or minus 0.5 dB or finer resolution is desired. The gain signal is derived, in one embodiment as follows:

GAIN=ABS(DELTA2/DELTA1)dB

Figure 16:
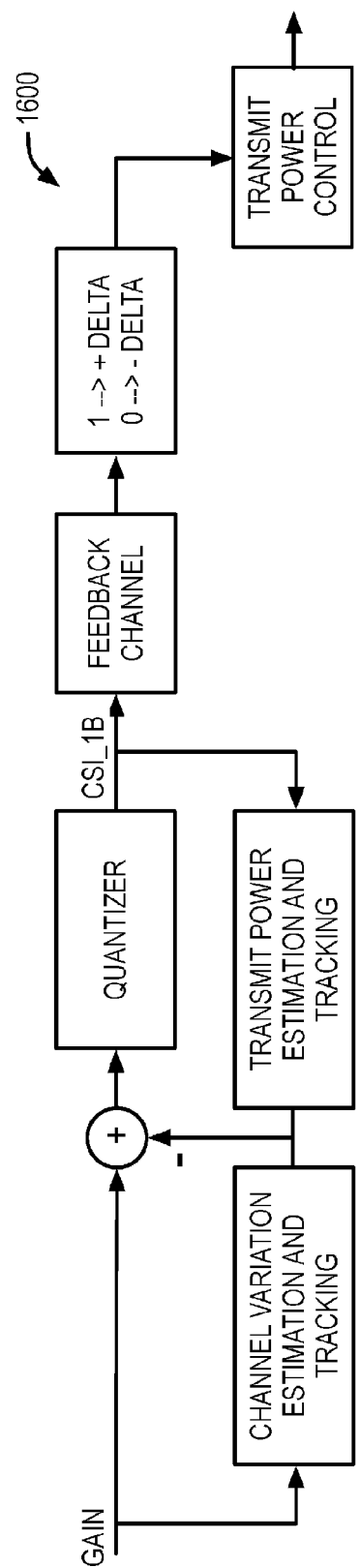
FIG. 16 is a block diagram highlighting a flow for access terminal side channel quantization according to the present invention.

FIG. 16 is a block diagram highlighting a flow 1600 for access terminal side channel quantization according to the present invention. In addition to the access network flow elements, the flow 1600 of FIG. 16 also shows a feedback channel element producing a CSI signal at the access terminal, which is provided to an interpreter ("1→+DELTA"), thus passing the interpreted gain adjustment to a transmit power control element.

In one embodiment, the transmit power difference is equal to the channel response gain difference between two AT TX antennas/pilots: $\Delta_p[n] \approx \Delta_h[n]$, where $\Delta$ is equivalent to DELTA:

$\Delta :=$ Power control step size, which is 0.5 dB in the following example;

$\Delta_h[n] :=$ The channel response/gain difference between two AT TX antennas;

$\Delta_p[n] :=$ The TX power difference between two AT TX antennas; and $\tilde{\Delta}_{p+h}[n]=\tilde{\Delta}_{p+h}[n-1]+2b[n-1]\Delta :=$ Predicted received power difference from two AT TX antennas or pilots.

| step | $\Delta_h[n]$ | $\Delta_p[n]$ | $\Delta_{p+h}[n]$ | $\tilde{\Delta}_{p+h}[n-1]+2b[n-1]\Delta$ | $\Delta_{p+h}[n]-\tilde{\Delta}_{p+h}[n-1]-b[n-1]\Delta$ | b[n] | $\Delta_p[n]$ |
|---|---|---|---|---|---|---|---|
| 0 | 0 | | 0 | | | | |
| 1 | 0 | 0 | 0 | 0 | 0 | +1 | 0.5 |
| 2 | 0 | 0.5 | 0.5 | 1.0 | −1.0 | −1 | 0 |
| 3 | 0 | 0 | 0 | 0 | 0.5 | +1 | 0.5 |
| 4 | 0 | 0.5 | 0.5 | 1.0 | −1.0 | −1 | 0 |
| 5 | 0 | 0 | 0 | 0 | 0.5 | +1 | 0.5 |
| 6 | 0 | 0.5 | 0.5 | 1.0 | −1.0 | −1 | 0 |
| 7 | 0 | 0 | 0 | 0 | 0.5 | +1 | 0.5 |
| 8 | 0 | 0.5 | 0.5 | 1.0 | −1.0 | −1 | 0 |
| 9 | 0 | 0 | 0 | 0 | 0.5 | +1 | 0.5 |
| 10 | 0 | 0.5 | 0.5 | 1.0 | −1.0 | −1 | 0 |
| 11 | 4.0 | 0 | 4.0 | 0 | 0.5 | +1 | 0.5 |
| 12 | 4.0 | 0.5 | 4.5 | 1.0 | 3.0 | +1 | 1.0 |
| 13 | 4.0 | 1.0 | 5.0 | 2.0 | 2.5 | +1 | 1.5 |
| 14 | 4.0 | 1.5 | 5.5 | 3.0 | 2.0 | +1 | 2.0 |
| 15 | 4.0 | 2.0 | 6.0 | 4.0 | 1.5 | +1 | 2.5 |
| 16 | 4.0 | 2.5 | 6.5 | 5.0 | 1.0 | +1 | 3.0 |
| 17 | 4.0 | 3.0 | 7.0 | 6.0 | 0.5 | +1 | 3.5 |
| 18 | 4.0 | 3.5 | 7.5 | 7.0 | 0 | +1 | 4.0 |
| 19 | 4.0 | 4.0 | 8.0 | 8.0 | −0.5 | −1 | 3.5 |
| 20 | 4.0 | 3.5 | 7.5 | 7.0 | 0 | +1 | 4.0 |
| 21 | 4.0 | 4.0 | 8.0 | 8.0 | −0.5 | −1 | 3.5 |
| 22 | 4.0 | 3.5 | 7.5 | 7.0 | 0 | +1 | 4.0 |
| 23 | 3.0 | 4.0 | 7.0 | 8.0 | −1.5 | −1 | 3.5 |
| 24 | 3.0 | 3.5 | 6.5 | 7.0 | −1.0 | −1 | 3.0 |
| 25 | 3.0 | 3.0 | 6.0 | 6.0 | −0.5 | −1 | 2.5 |
| 26 | 3.0 | 2.5 | 5.5 | 5.0 | 0 | +1 | 3 |
| 27 | 3.0 | 3.0 | 6.0 | 6.0 | −0.5 | −1 | 2.5 |
| 28 | 3.0 | 2.5 | 5.5 | 5.0 | 0 | +1 | 3.0 |
| 29 | 3.0 | 3.0 | 6.0 | 6.0 | −0.5 | −1 | 2.5 |
| 30 | 8.0 | 2.5 | 10.5 | 5.0 | 5.0 | +1 | 3.0 |
| 31 | 8.0 | 3.0 | 11.0 | 6.0 | 4.5 | +1 | 3.5 |
| 32 | 8.0 | 3.5 | 11.5 | 7.0 | 4.0 | +1 | 4.0 |
| 33 | 8.0 | 4.0 | 12.0 | 8.0 | 3.5 | +1 | 4.5 |
| 34 | 8.0 | 4.5 | 12.5 | 9.0 | 3.0 | +1 | 5.0 |
| 35 | 8.0 | 5.0 | 13.0 | 10.0 | 2.5 | +1 | 5.5 |
| 36 | 8.0 | 5.5 | 13.5 | 11.0 | 2.0 | +1 | 6.0 |
| 37 | 8.0 | 6.0 | 14.0 | 12.0 | 1.5 | +1 | 6.5 |
| 38 | 8.0 | 6.5 | 14.5 | 13.0 | 1.0 | +1 | 7.0 |
| 39 | 8.0 | 7.0 | 15.0 | 14.0 | 0.5 | +1 | 7.5 |
| 40 | 8.0 | 7.5 | 15.5 | 15.0 | 0 | +1 | 8.0 |
| 41 | 8.0 | 8.0 | 16.0 | 16.0 | −0.5 | −1 | 7.5 |
| 42 | 8.0 | 7.5 | 15.5 | 15.0 | 0 | +1 | 8.0 |

Accordingly, the example contemplates:

Step 1: AN updates the existing received power differential or SNR differentials between two AT TX antennas. $\Delta_{p+h}[n]$ Step 2: AN estimates the sum of channel fluctuation and Tx power fluctuation.

$\tilde{\Delta}_{p+h}[n-1]=\tilde{\Delta}_{p+h}[n-1]+b[n-1]\Delta$ if there is no error on the feedback channel, or $\tilde{\Delta}_{p+h}[n-1]=\tilde{\Delta}_{p+h}[n-1]-b[n-1]\Delta$, if there is error on the feedback channel.

Step 3: AN estimates difference between channel $\Delta_h[n]$ and TX Power $\Delta_p[n]$, $\Delta_{p+h}[n]-\tilde{\Delta}_{p+h}[n-1]=\Delta_{p+h}[n]-(\tilde{\Delta}_{p+h}[n-1]+2b[n-1]\Delta)$ Step 4: Quantize the difference $\Delta_{p+h}[n]-\tilde{\Delta}_{p+h}[n-1]$. Where $\Delta h[n]$, $\Delta p+h[n]$ is the channel response vector. It could be a column or a row of the channel response matrix, depending the way of notation. b[n] is the bits or bit vector to be sent or to be received/decoded.

Figure 17:
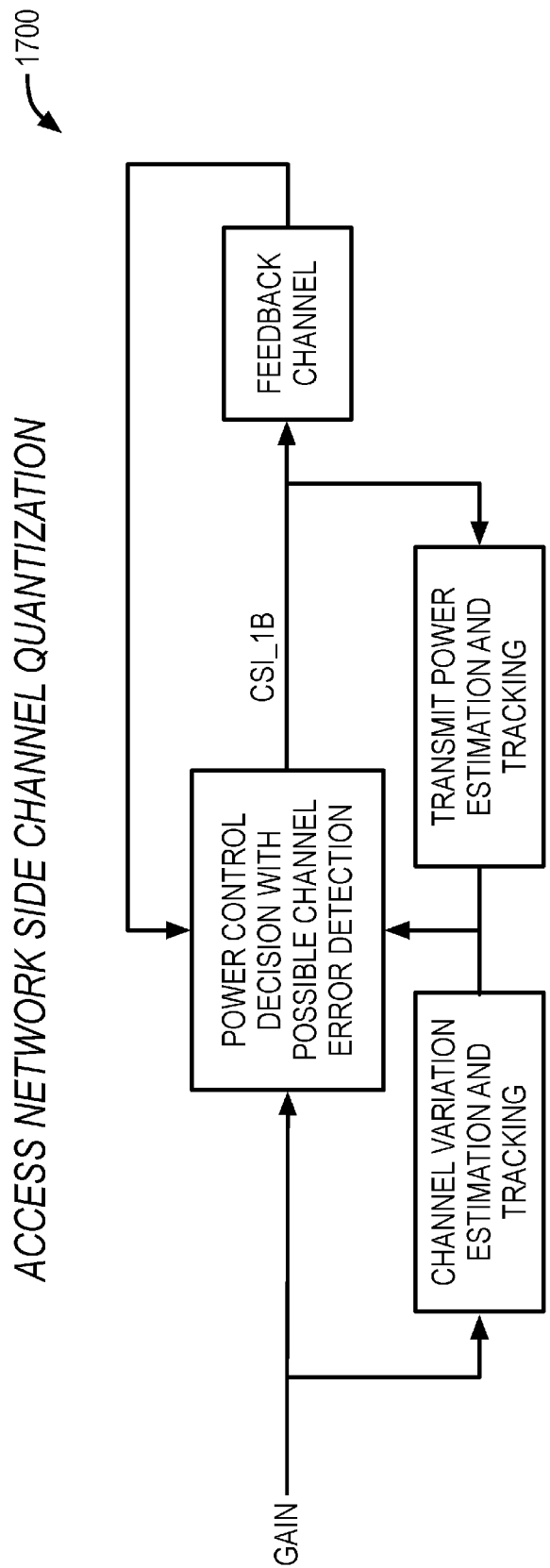
FIG. 17 is a diagram featuring a flow for access network side channel quantization according to the present invention.

FIG. 17 is a diagram featuring a flow for access network side channel quantization according to the present invention including error propagation control. A gain signal is provided to a power control decision with possible channel error detection element and a channel variation estimation and tracking element. The power decision element generates a single-bit CSI signal, which is fed back to a transmit power estimation and tracking element and to a feedback channel element. The output of the feedback channel element is returned to the power control decision element. The outputs of the channel variation estimation and tracking element and the transmit power estimation and tracking element are provided to the power control decision element. The gain signal is derived, in one embodiment as follows:

GAIN=ABS(DELTA2/DELTA1)dB

Figure 18:
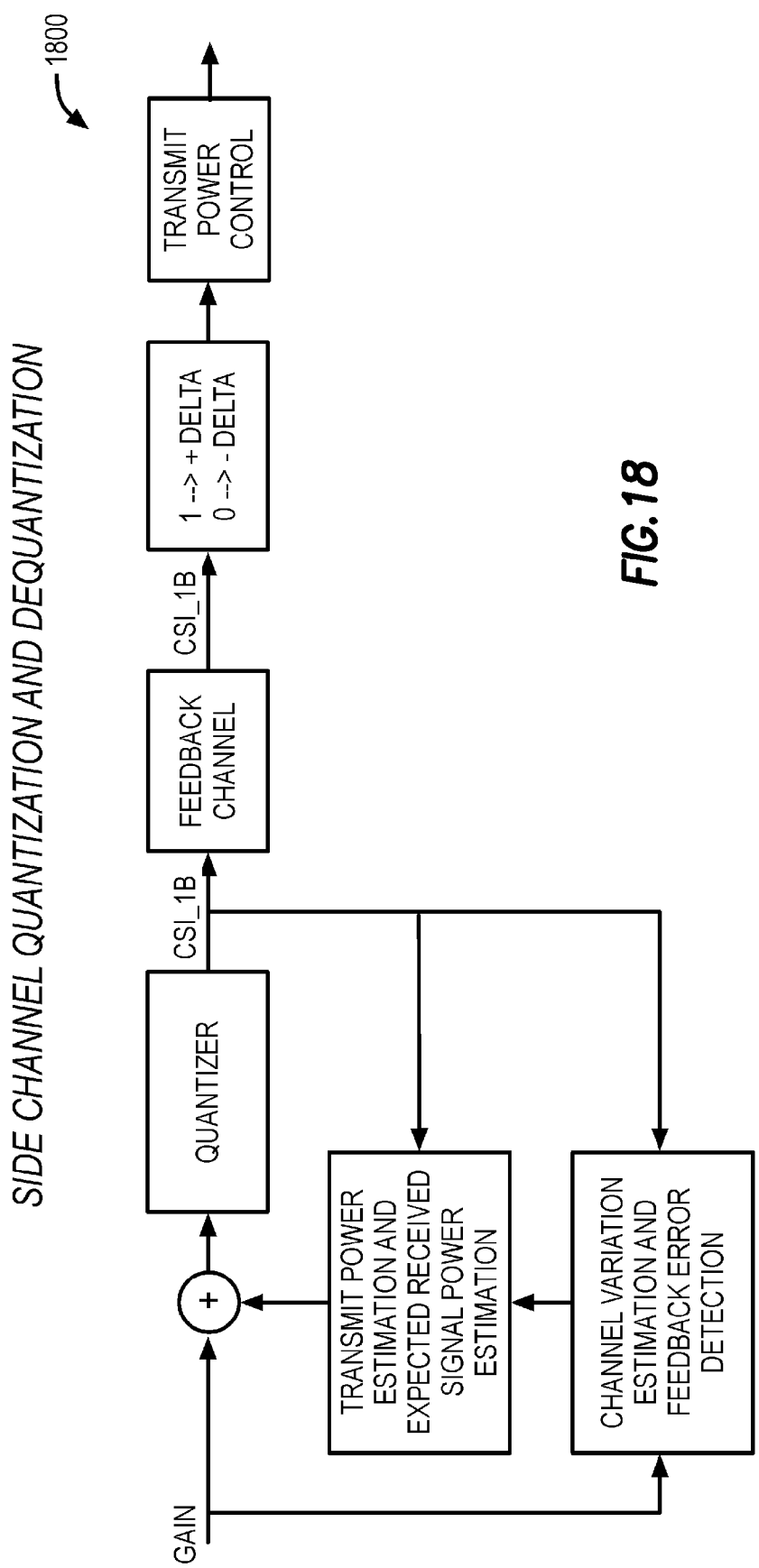
FIG. 18 is a block diagram illustrating a flow for access terminal side channel quantization according to the present invention.

FIG. 18 is a block diagram illustrating a flow 1800 for access terminal side channel quantization according to the present invention. In addition to the access network flow elements, the flow 1800 of FIG. 18 also shows the feedback channel element producing a CSI signal at the access terminal, which is provided to an interpreter ("1→+DELTA"), thus passing the interpreted gain adjustment to a transmit power control element.

It is recommended to periodically reset the accumulator. Thus, the AT power allocation is periodically reset into a predefined value, say the AT TX power half and half split between two TX antennas. Therefore the AN side can reset the local TX power estimator accordingly.

For Error Propagation detection, employ the following where $\Delta$ is equivalent to DELTA:

$\Delta_{p+h}[n]-\tilde{\Delta}_{p+h}[n-1]=\Delta_{p+h}[n]-(\tilde{\Delta}_{p+h}[n-1]+2b[n-1]\Delta)$ Calculate $D=\Delta_{p+h}[n]-\Delta_{p+h}[n-1]$ If $Db[n-1]\Delta \geq 0$, this means the power differential change of actual received signal is in the same direction of power control. Therefore, local predication of the sum of channel differential and TX power differential should be updated as $\tilde{\Delta}_{p+h}[n]=\tilde{\Delta}_{p+h}[n-1]+2b[n-1]\Delta.$ Other wise, it means there may be some error that occurred on the feedback channel. Therefore, $\tilde{\Delta}_{p+h}[n]=\tilde{\Delta}_{p+h}[n-1]-b[n-1]\Delta$.

| step | $\Delta_h[n]$ | $\Delta_p[n]$ | $\Delta_{p+h}[n]$ | $\tilde{\Delta}_{p+h}[n-1]+2b[n-1]\Delta$ | $\Delta_{p+h}[n] - \tilde{\Delta}_{p+h}[n-1]$ | b[n] | $\Delta_p[n]$ |
|---|---|---|---|---|---|---|---|
| 0 | 0 |   | 0 |   |   | 0 |   |
| 1 | 0 | 0 | 0 | 0 | 0 | +1 | 0.5 |
| 2 | 0 | 0.5 | 0.5 | 1.0 | −0.5 | −1 | 0 |
| 3 | 0 | 0 | 0 | 0 | 0 | +1 | 0.5 |
| 4 | 0 | 0.5 | 0.5 | 1.0 | −0.5 | −1 | 0 |
| 5 | 0 | 0 | 0 | 0 | 0 | +1 | 0.5 |
| 6 | 0 | 0.5 | 0.5 | 1.0 | −0.5 | −1 | 0 |
| 7 | 0 | 0 | 0 | 0 | 0 | +1 | 0.5 |
| 8 | 0 | 0.5 | 0.5 | 1.0 | −0.5 | −1 | 0 |
| 9 | 0 | 0 | 0 | 0 | 0 | +1 | 0.5 |
| 10 | 0 | 0.5 | 0.5 | 1.0 | −0.5 | −1 | 0 |
| 11 | 4.0 | 0 | 4.0 | 0 | 4.0 | +1 | 0.5 |
| 12 | 4.0 | 0.5 | 4.5 | 1.0 | 3.5 | +1 | 1.0 |
| 13 | 4.0 | 1.0 | 5.0 | 2.0 | 3.0 | +1 | 1.5 |
| 14 | 4.0 | 1.5 | 5.5 | 3.0 | 2.5 | +1 | 2.0 |
| 15 | 4.0 | 2.0 | 6.0 | 4.0 | 2.0 | +1 | 2.5 |
| 16 | 4.0 | 2.5 | 6.5 | 5.0 | 1.5 | +1->−1 | 2.0 |
| 17 | 4.0 | 2.0 | 6.0 | 4.0 | 2.0 | +1 | 2.5 |
| 18 | 4.0 | 2.5 | 6.5 | 5.0 | 1.5 | +1 | 3.0 |
| 19 | 4.0 | 3.0 | 7.0 | 6.0 | 1.0 | +1 | 3.5 |
| 20 | 4.0 | 3.5 | 7.5 | 7.0 | 0.5 | +1 | 4.0 |
| 21 | 4.0 | 4.0 | 8.0 | 8.0 | 0 | +1 | 4.5 |
| 22 | 4.0 | 4.5 | 8.5 | 9.0 | −0.5 | −1 | 4.0 |
| 23 | 4.0 | 4.0 | 8.0 | 8.0 | 0 | +1 | 4.5 |

Regarding an optimization target, it is a feature of the present invention to power control, in one embodiment, a dual-antenna transmitter through a feedback channel so that the TX power differentiation between the two TX antennas is proportional to the channel response differentiation.

Another aspect of the present invention is to power control a dual-antenna transmitter through a feedback channel so that the received signal power from the two antennas are almost equal to each other.

The present inventors also note a possible dilemma between TX power control and Tx co-phasing control. Thus, for optimal co-phase vector estimation, it may be expected that the received signal power from two different antennas are close to each other. Consequently, for the power allocation between two antennas of optimal reception SNR, it may be expected that the antenna with a good channel condition is allocated more power than the antenna with a secondary channel condition.

Furthermore, considering imbalanced TX power allocation or antenna selection is not very desirable for co-phase vector estimation, thus it is recommended to periodically reset AT antenna power allocation to a predefined value, say the equal TX power allocation noted above.

Moreover, the difference of power allocations between two antennas can be limited between a certain threshold so that the differentiation between the received signal power from two antennas is not too large for the next co-phase vector estimation or other purpose.

An additional aspect of the present invention comprehends, as alluded to above, transmitting a secondary pilot from the transmitter in order to calculate phase adjustment. For example, a secondary pilot is sent in one slot of every four slots, as is depicted in FIG. 4.

The power adjustment bits are decided through the calculating the singularity of the channel, which can be the ratio of the singular values of the correlation matrix of received signals from two receive antennas.

The receiver can keep track the beamforming vector or matrix used by the transmitter and the power through observing the received signals changes before and after each adjustment and the sent adjustment.

Figure 19:
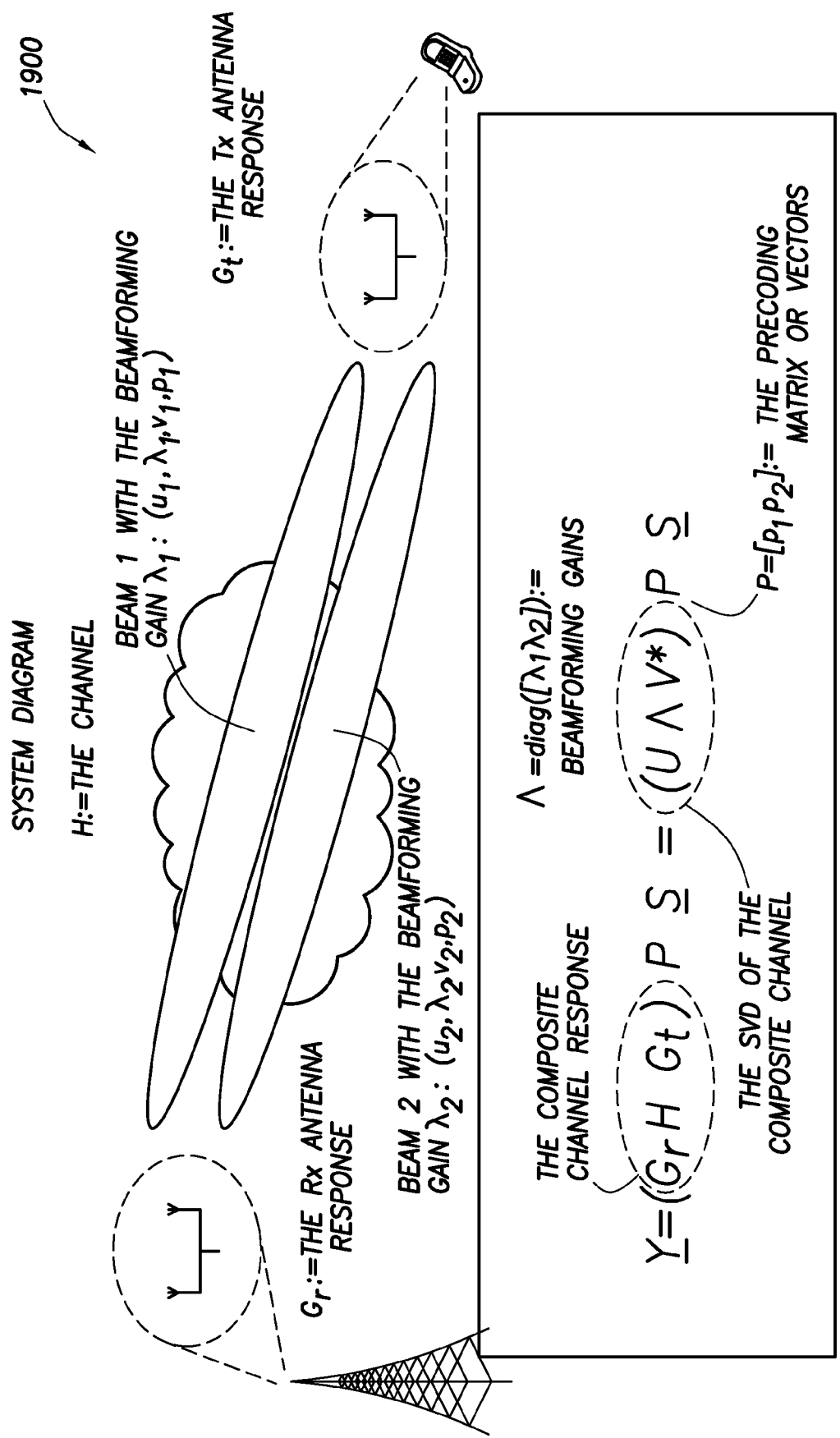
FIG. 19 is a block diagram showing a system according to the present invention.

Now referring to FIG. 19, a system according to the present invention is shown. Accordingly, two observations are noted:

Observation I: If the TX uses p1 as the precoding vector, which matches v1, and the receiver uses u1, the beamforming gain, $\lambda 1$, is achievable.

Observation II: For the rank-1 MTD with the beamforming vector p1 or MIMO at low SNR region, such as in DO Reverse Link, the optimal policy is to allocate power more or only to the strongest eigenmode $\lambda 1$, where:

$$p = \underset{w \in W}{\arg\max}\, w^H \lfloor (YS^{-1})^H (YS^{-1})w \rfloor$$

$$= \underset{w \in W}{\arg\max}\, w^H (P^H G_t^H H^H G_r^H GHGP)w$$

$$\text{maxy} = \max\left(\frac{\lambda_{max}}{\lambda_{min}}\right)$$

$$[U \wedge V] = SVD(E\{YY^H\})$$

$$SVD(E\{(G_r HG_t PS)(G_r HG_t PS)^H\})$$

$$SVD(G_r HG_t G_t^H H^H G_r^H)$$

According to observation I, the existing approach is to find a beamforming vector which matches the eigenvector of the composite channel.

Following observation II, Y is the received signal matrix, in which each entry denotes the signal received from one antenna during one symbol period. S:=the sent signal symbol matrix or vectors. W:=the weight matrix applied on the receiver for demodulating the symbols S P:=the precoding matrix applied on the transmitter before sending the symbols S U,V:=the SVD of the composite channel matrix of GrHGt the proposed approach is to adjust the TX power ratio between two RL TX antennas so that the condition number of the composite channel is increased.

Figure 20:
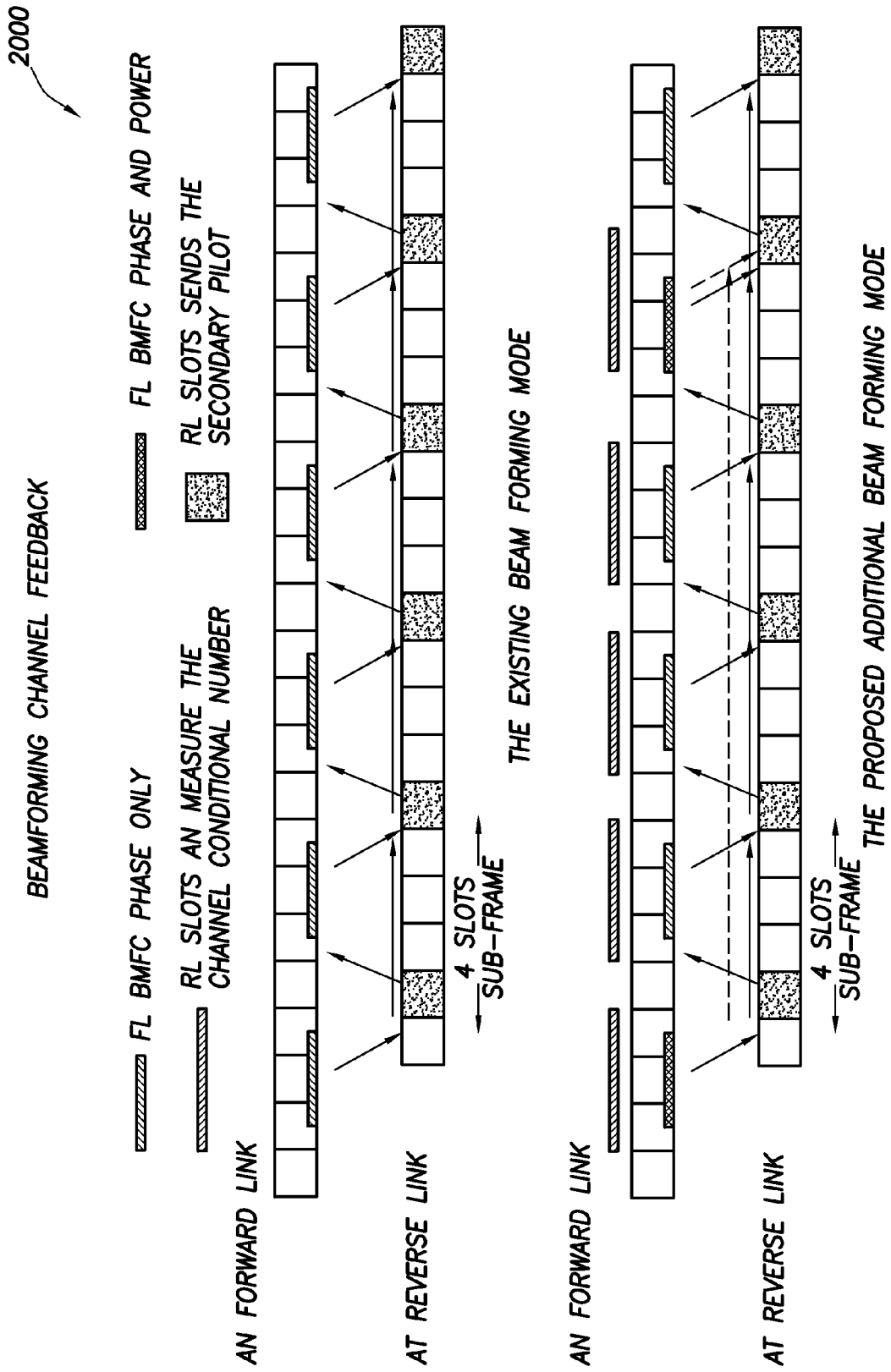
FIG. 20 is a block diagram showing a slot structure for beamforming channel feedback according to the present invention.

FIG. 20 is a block diagram showing a slot structure 2000 for beamforming channel feedback according to the present invention. The structure 2000 is substantially similar to that of FIG. 4, with the exception that in the proposed beamforming mode, FL BMFC phase and power adjustment is sent over the FL every four sub-frames, and the remaining three sub-frames contain phase only FL BMFC. Thus, in the embodiment shown in FIG. 20, BMFC is transmitted for one or two slots every sub-frame and, as noted above, it is transmitted using an additional FL MAC index. For an AT in CL-MTD mode, an additional FL MAC index is assigned.

Target performance is desired to be approximately the same as the RPC channel. Thus, the AN transmits one additional bit, RL TX power adjustment bit, to the AT for adjusting RL TX power allocation between two TX antennas of each RL-MTD AT. In one embodiment, this additional bit can be punctured into the least significant bit of a 2-bit phase feedback as noted above. In another embodiment, the additional bit is transmitted through the differentiation coding between two consecutive slots when 2-bit phase feedback is sent in two slots every 4-slot sub-frame. The actual mechanism for AN to decide the power adjustment bits is an implementation issue and is beyond the scope of the present application. The power adjustment bit is transmitted either every 16 slots or every 64 slots. When the AT receives this bit, it will increase or decrease the TX power ratio a predefined step accordingly. Additionally, every 256 slots, the AT TX power will be reset back to equal power allocation. When the TX power ratio between two TX antennas is larger than a threshold, say 9 dB, the antenna with less TX power may be turned off during the slots when the secondary pilot is not transmitted.

The beamforming vector is calculated when there is a secondary pilot being sent from the transmitter. At this time, the received signal can be expressed by $$r = \begin{bmatrix} r_1(n) \\ r_2(n) \end{bmatrix}$$
$$= HGPs$$
$$= \begin{bmatrix} h_{11} & h_{12} \\ h_{21} & h_{22} \end{bmatrix} G[p_1(n) \; p_2(n)] \begin{bmatrix} s_1(n) \\ s_2(n) \end{bmatrix},$$

where
$r_1(n)$ and $r_2(n)$ are two symbols received from two receive antennas at the time t=n, individually;

$$\begin{bmatrix} h_{11} & h_{12} \\ h_{21} & h_{22} \end{bmatrix}$$

is the 2 by 2 channel response matrix;
G is the antenna response matrix;
$P=\lfloor p_1(n) \; p_2(n) \rfloor$ is the precoding matrix, where $p_1(n)$ is the precoding vector for the primary pilot and data at the time t=n;

$$s = \begin{bmatrix} s_1(n) \\ s_2(n) \end{bmatrix}$$

is the symbol vectors sent at the time t=n. $s_1(n)$ is the primary pilot plus data; and
$s_2(n)$ is the secondary pilot when is sent only when the secondary pilot is sent.
Therefore, when the secondary pilot is sent, it is noted that:

$$Y(n) = HGP$$
$$= [r(n) \; r(n+1)][s(n) \; s(n+1)]^{-1}$$

The precoding vector for the next beamforming feedback can be calculated through:

$$p = \arg \max_{x \in codebook} x^H \left( \sum Y^H(n)Y(n) \right) x$$
$$= \arg \max_{x \in codebook} x^H (P^H G^H H^H H G P) x$$

The singularity of the channel is estimated through calculating the correlation matrix received signal vector:

$$R_r = \sum r^H(n)r(n)$$
$$= \sum HGPs(n)s^H(n)P^H G^H H^H$$

This correlation matrix $R_r$ is preferred to be calculated when there is no secondary pilot from the transmitter, through it can be calculated at any time.

Then the singularity of $R_r$ can be calculated through singular-value decomposition of $R_r$:

$$SVD(R_r) = U\Lambda\Lambda^H$$
$$= U\begin{bmatrix} \lambda_1 & \\ & \lambda_2 \end{bmatrix} V^H, \text{ where } \lambda_1 \geq \lambda_2.$$

The singularity is $$\gamma = \frac{\lambda_1}{\lambda_2}$$

Figure 21:
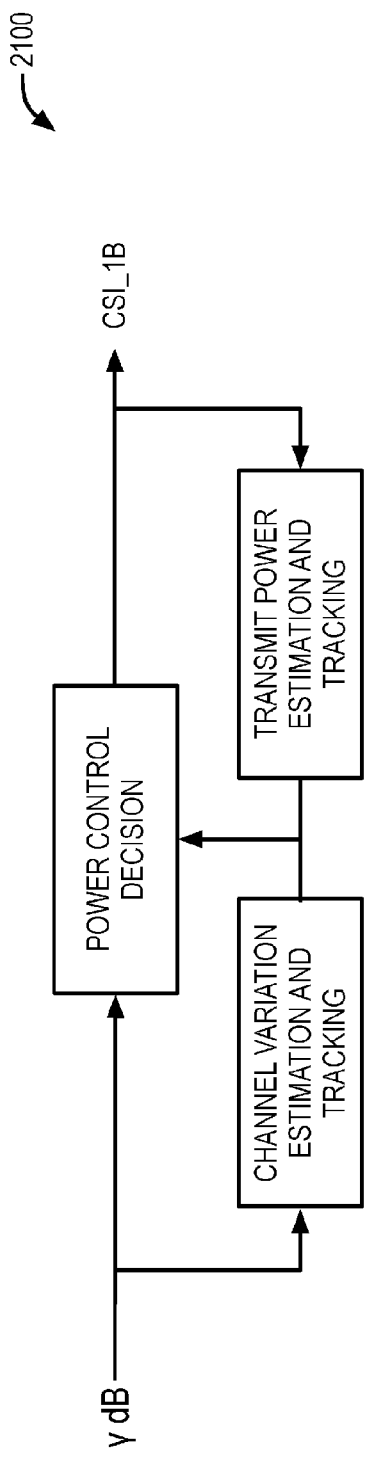
FIG. 21 is a block diagram illustrating a flow for access network side channel quantization according to the present invention.

FIG. 21 is a diagram 2100 showing a flow for access network side channel quantization according to the present invention. The singularity signal y is provided to a power decision control element and a channel variation estimation and tracking element. The power decision control element generates a single-bit CSI signal, which is fed back to a transmit power estimation and tracking element. The outputs of the channel variation estimation and tracking element and the transmit power estimation and tracking element are provided to the power control decision element.

Figure 22:
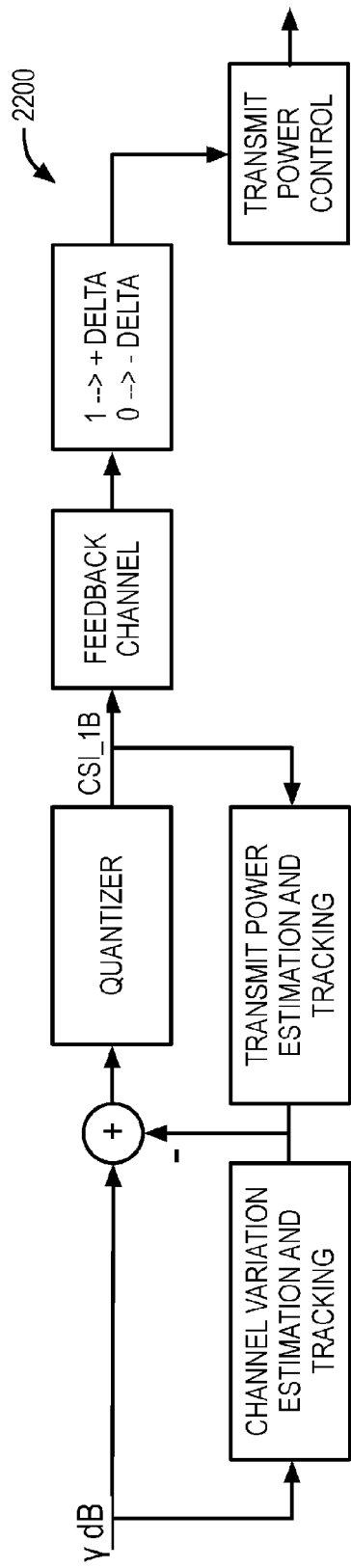
FIG. 22 is a block diagram showing a flow for access terminal side channel quantization according to the present invention.

FIG. 22 is a block diagram highlighting a flow 2200 for access terminal side channel quantization according to the present invention. In addition to the access network flow elements, the flow 2200 of FIG. 22 also shows a feedback channel element producing a CSI signal at the access terminal, which is provided to an interpreter ("1→+DELTA"), thus passing the interpreted adjustment to a transmit power control element. One power control target is to increase the singularity through adjusting the TX power allocation between two TX antennas. DELTA:=Power Adjustment step size, which can be 2 dB, 1 dB, or fixed to match to the size of beamforming codebook size or beamforming resolution.

Actual power Allocation Adjustment rule is an implementation issue. In this example, the optimal power allocation adjustment target is to meet the TX power difference $\Delta_{TX}[n]$ with the channel gain difference between two AT pilots, $\Delta_h[n]$, which can be written by $\Delta_{TX}[n] \approx \Delta_h[n]$. This in turn is implemented through matching the power allocation $\Delta_{TX}[n]$ with the channel singularity $$\gamma = \frac{\lambda_1}{\lambda_2}.$$

Figure 23:
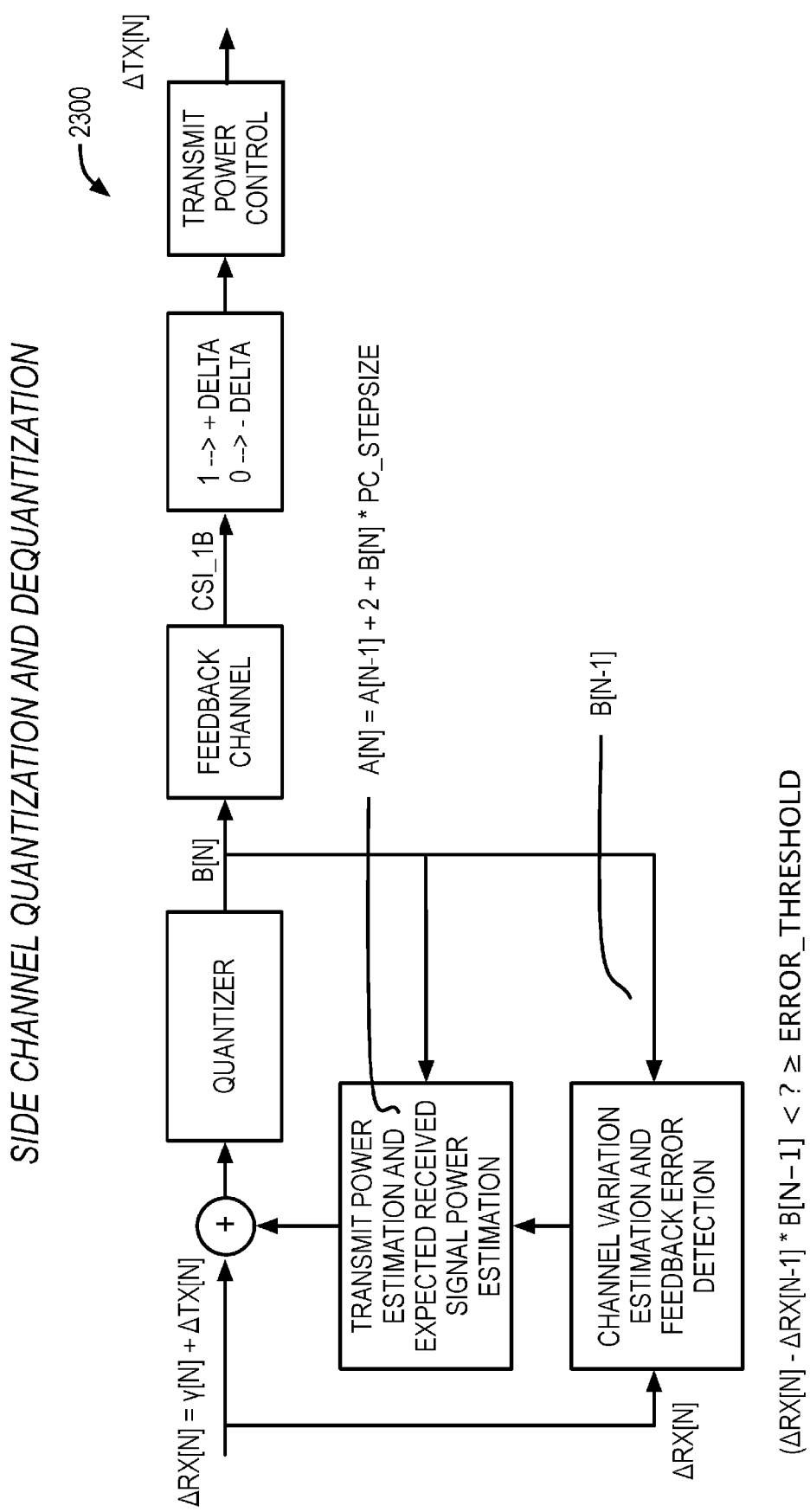
FIG. 23 is a block diagram illustrating A flow for side channel quantization and dequantization according to the present invention.

Error detection mechanism also completely is an implementation issue, but an exemplary flow 2300 is presented in FIG. 23. In this configuration, a parameter, ERROR_THRESHOLD, is introduced to be compared with the fluctuation of $\Delta_{TX}[n]$ to decide if an feedback error happened in the last feedback, where:
  PC_STEPSIZE (0.5 dB, 1 dB, 2 dB, or matched to the size of beamforming codebook size or resolution
  $\lambda[n]$:=The channel singularity.
  $\Delta_{TX}[n]$:=The TX power difference between two AT TX antennas
  A[n]:=Predicted received power difference from two AT TX antennas or pilots.
If the channel errors are not detected, A[n] is updated with
  A[n]=A[n−1]+2*b[n]*PC_STEPSIZE If the channel errors are detected, A[n] is calibrated with A[n−1]=A[n−1]−4*b[n]*PC_STEPSIZE before generating the next power control commend b[n]=sgn($\Delta_{RX}$[n]−A[n−1])

b[n]=sgn($\Delta_{RX}$[n]−A[n−1]):=RL MTD power control command bits.

ERROR_THRESHOLD:=this is the threshold for error detection, which can be 0 dB, −PC_STEPSIZE, or other predefined value.

Figure 24:
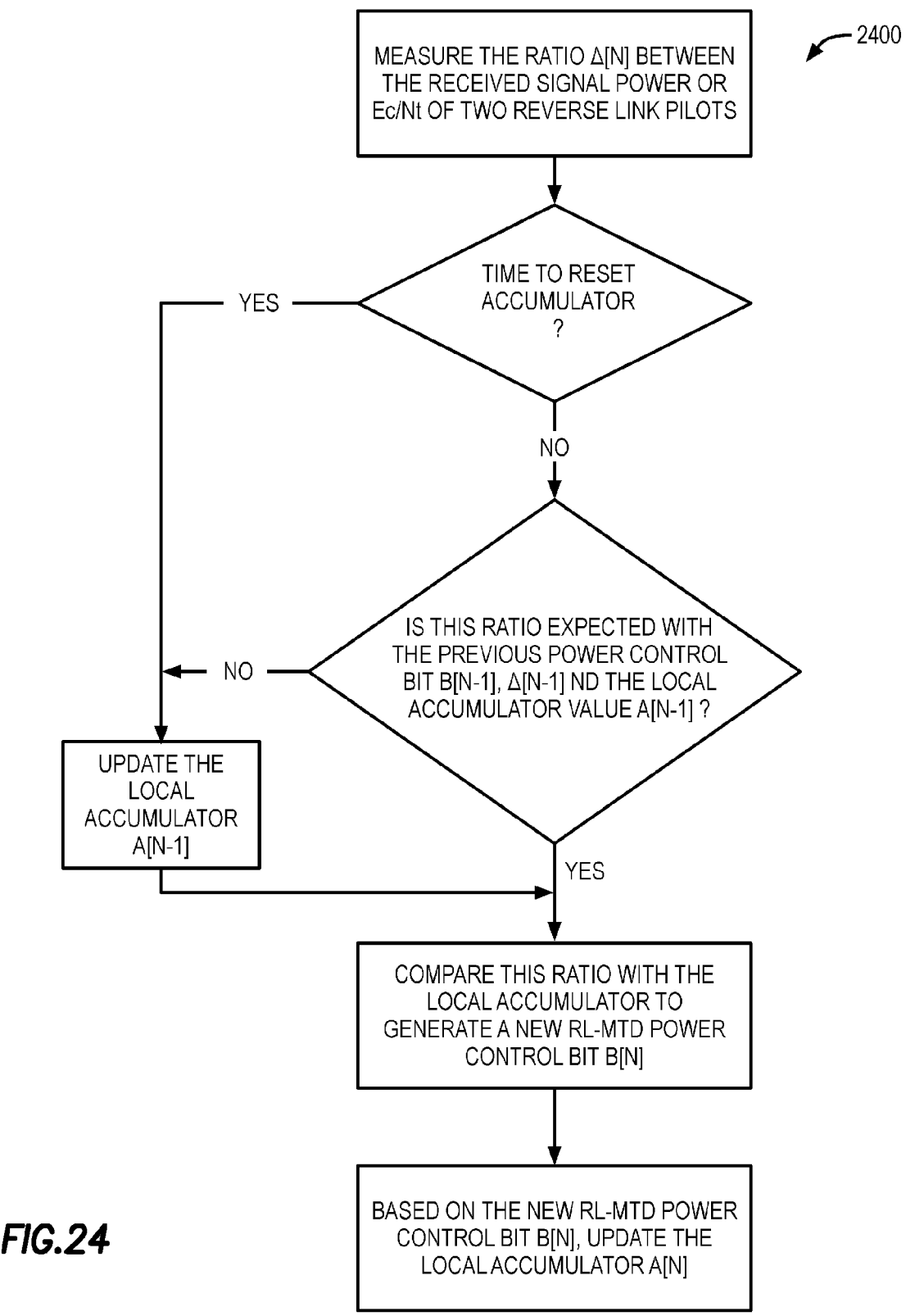
FIG. 24 is a flow diagram illustrating a reverse link beamforming method according to the present invention.

FIG. 24 is a flow diagram illustrating a reverse link beamforming method according to the present invention. Operationally, it is a feature of the present invention to power control a dual-antenna transmitter through a feedback channel so that the TX power differentiation between the two TX antennas is proportional to the channel response differentiation. Another aspect is to power control a dual-antenna transmitter through a feedback channel so that the received signal power from the two antennas are almost equal to each other.

The present inventors note a possible dilemma between TX power control and TX co-phasing control. Thus, for optimal co-phase vector estimation, it may be expected that the received signal power from two different antennas are close to each other. In addition, for the power allocation between two antennas of optimal reception SNR, it may be expected that the antenna with a good channel condition is allocation more power than the antenna with a secondary channel condition.

Considering that imbalanced TX power allocation or antenna selection is not very desirable for co-phase vector estimation, it is recommended to periodically reset AT antenna power allocation to a predefined value, say the equal TX power allocation.

The delta of power allocation between two antennas can be limited between a certain threshold so that the differentiation between the received signal power from two antennas is not too large for the next co-phase vector estimation or other purpose.

Those skilled in the art should appreciate that they can readily use the disclosed conception and specific embodiments as a basis for designing or modifying other structures for carrying out the same purposes of the present invention, and that various changes, substitutions and alterations can be made herein without departing from the scope of the invention as defined by the appended claims.

What is claimed is:

1. A system, comprising:
an access terminal, comprising:
 a first plurality of communication modules, wirelessly coupled to a second plurality of communication modules of an access network, that receives a first plurality of signals corresponding to the plurality of the communication modules;
 a receiver, coupled to the first plurality of communication modules, that receives an index from the access network which indicates a number of the first plurality of signals; and
 a processor, that adjusts a transmitting gain of the first plurality of communication modules; and
the access network, comprising:
 a channel estimator, that generates the second plurality of signals according to the first plurality of signals; and
 a channel variation estimator, that receives a gain signal corresponding to the first plurality of signals and that generates a channel variation vector according to the gain signal and the channel circumstances,
wherein the access network adjusts a power control signal to the access terminal according to the channel variation vector.

2. The system as recited in claim 1, wherein the access network further comprising:
 a TX power estimator, that receives the power control signal and that estimates a TX power vector of the first plurality of signals; and
 a power control signal generator, that receives the channel variation vector and the TX power vector, and that generates the power control signal.

3. The system as recited in claim 1, wherein the first plurality of signals comprises at least one of the following:
 a delay parameter between the plurality of communication modules;
 a phase difference parameter between the plurality of communication modules; and
 a power parameter of the plurality of communication modules.

4. The system as recited in claim 1, wherein the first plurality of communication modules transmits a plurality of pilots, wherein the plurality of pilots are calculated and transmitted according to the first plurality of signals received from the access network.

5. The system as recited in claim 1, wherein the processor further comprising:
 generates a channel state information from the first plurality of signals;
 increases the transmit power when the channel state information is a first value; and
 decreases the transmit power when the channel state information is a second value.

6. An apparatus wirelessly coupled to an access terminal, the apparatus comprising:
 a plurality of communication modules, coupled to the access terminal, that transmits a first plurality of signals;
 a transmitter, coupled to the access terminal, that sends an index which indicates a number of the plurality of signals;
 a channel estimator, that generates a second plurality of signals according to the first plurality of signals transmitted by the access terminal; and
 a channel variation estimator, that receives a gain signal corresponding to the first plurality of signals and that generates a channel variation vector according to the gain signal and the channel circumstances,
wherein the access network adjusts a power control signal to the access terminal according to the channel variation vector.

7. The apparatus as recited in claim 6, wherein the access network further comprising:
 a TX power estimator, that receives the power control signal and that estimates a TX power vector of the first plurality of signals; and
 a power control signal generator, that receives the channel variation vector and the TX power vector, and that generates the power control signal.

8. The apparatus as recited in claim 6, wherein the first plurality of signals comprises at least one of the following:
 a delay parameter between the plurality of communication modules;
 a phase difference parameter between the plurality of communication modules; and
 a power parameter of the access terminal.

9. The apparatus as recited in claim 6, wherein the channel estimator calculates the singularity of a channel response vector according to the first plurality of signals.

10. The apparatus as recited in claim 6, wherein the channel estimator comprises:
a feedback error detector, that receives a gain signal and a power control signal and that provides a error detecting signal;
a power estimator, that receives the error detecting signal and the power control signal and that estimates a TX power vector; and
a quantizer, that receives the TX power vector and that maps the TX power vector into the power control signal which is related to the first plurality of signals.

11. The apparatus as recited in claim 10, wherein the feedback error detector further comprises:
a timer, that directs the feedback error detector to update an accumulating value periodically;
a comparator, that receives the gain signal and that decides whether the gain signal is bigger than a previous power control signal and the accumulating value; and
a processor, wherein when the accumulating value is updated and the gain signal is bigger than the previous power control signal and the accumulating value, the processor generates the TX power vector according to the accumulating value and the power control signal.

12. The apparatus as recited in claim 6, wherein the channel estimator comprises
an estimator, that uses a first phase of one of the first plurality of signals as a reference signal, and that calculates a phase difference of the reference signal and another plurality of signals; and
a modulator, coupled to the estimator, that maps the phase difference to a plurality of bits.

13. The apparatus as recited in claim 12, wherein the reference signal further comprises a second phase with a interval of the first phase.

14. The apparatus as recited in claim 12, wherein the modulator employs one of the following:
a direct delta modulation;
a delta sigma modulation;
an adaptive delta modulation;
a leaky delta modulation; and
a linear quantization.

15. A method for a system which comprising an access terminal wirelessly coupled to an access network, the method comprising:
within the access terminal:
receiving a plurality of signals corresponding to a plurality of communication modules;
receiving an index from the access network which indicates a number of the plurality of signals; and
adjusting the gain of the access terminal; and
within the access network:
receiving a gain signal corresponding to the plurality of signals and generating a channel variation vector according to the gain signal and channel circumstances;
wherein the access network adjusts a power control signal to the access terminal according to the channel variation vector.

16. The method as recited in claim 15, further comprising:
receiving a power control signal and estimating a TX power vector of the plurality of signals; and
receiving the channel variation vector and the TX power vector, and generating the power control.

17. The method as recited in claim 15, wherein the plurality of signals comprises at least one of the following:
a delay parameter between the plurality of communication modules;
a phase difference parameter between the plurality of communication modules; and
a power parameter of the plurality of communication modules.

18. The method as recited in claim 15, wherein the method further comprises transmitting a plurality of pilots, wherein the plurality of pilots are calculated and transmitted according to the plurality of signals received from the access network.

19. The method as recited in claim 15, wherein the method further comprises:
generating a channel state information from the plurality of signals;
increasing a transmit power when the channel state information is a first value; and
decreasing the transmit power when the channel state information is a second value.

20. A method for an access network which is wirelessly coupled to an access terminal, the method comprising:
transmitting, by the access terminal, a plurality of signals corresponding to a plurality of communication modules;
sending, by the access network, an index which indicates a number of the plurality of signals; and
adjusting and modulating a channel state information into the plurality of signals;
receiving a gain signal corresponding to the plurality of signals and generating a channel variation vector according to the gain signal and channel circumstances;
wherein the access network adjusts a power control signal to the access terminal according to the channel variation vector.

21. The method as recited in claim 20, further comprising:
receiving a power control signal and estimating a TX power vector of the plurality of signals; and
receiving the channel variation vector and the TX power vector, and generating the power control signal.

22. The method as recited in claim 20, wherein the plurality of signals comprises at least one of the following:
a delay parameter between the plurality of communication modules;
a phase difference parameter between the plurality of communication modules; and
a power parameter of the access terminal.

23. The method as recited in claim 20, wherein the method further comprises calculating the singularity of a channel response vector according to the plurality of signals.

24. The method as recited in claim 20, wherein the method further comprises:
receiving a gain signal and a power control signal and providing a error detecting signal;
receiving the error detecting signal and the power control signal and estimating a TX power vector; and
mapping the TX power vector into the power control signal which is related with the plurality of signals.

25. The method as recited in claim 24, wherein the method further comprises:
indicating an update to an accumulating value periodically;
deciding whether the gain signal is bigger than a previous power control signal and the accumulating value; and
generating the TX power vector according to the accumulating value and the power control signal, when the accumulating value is updated and the gain signal is bigger than the previous power control signal and the accumulating value.

26. The method as recited in claim 20, wherein the method further comprises:

using a first phase of one of the plurality of signals as a reference signal, and calculating the phase difference of the reference signal and another plurality of signals; and mapping the phase difference to a plurality of bits.

27. The method as recited in claim 26, wherein the reference signal comprises a second phase with a interval of the first phase.

28. The method as recited in claim 26, wherein the mapping comprises using one of the following:
   a direct delta modulation;
   a delta sigma modulation;
   an adaptive delta modulation;
   a leaky delta modulation; and
   a linear quantization.

* * * * *